United States Patent
Kobayashi et al.

(10) Patent No.: US 7,851,100 B2
(45) Date of Patent: Dec. 14, 2010

(54) MEA-GASKET ASSEMBLY AND POLYMER ELECTROLYTE FUEL CELL USING SAME

(75) Inventors: Susumu Kobayashi, Nara (JP); Yasuhiro Seki, Osaka (JP)

(73) Assignee: Panasonic Corporation, Osaka (JP)

( * ) Notice: Subject to any disclaimer, the term of this patent is extended or adjusted under 35 U.S.C. 154(b) by 663 days.

(21) Appl. No.: 11/664,806

(22) PCT Filed: Oct. 6, 2005

(86) PCT No.: PCT/JP2005/018517

§ 371 (c)(1),
(2), (4) Date: Apr. 6, 2007

(87) PCT Pub. No.: WO2006/040994

PCT Pub. Date: Apr. 20, 2006

(65) Prior Publication Data

US 2007/0264557 A1  Nov. 15, 2007

(30) Foreign Application Priority Data

Oct. 8, 2004 (JP) .................... 2004-296702

(51) Int. Cl.
*H01M 8/04* (2006.01)
*H01M 8/10* (2006.01)
*H01M 2/08* (2006.01)
*H01M 4/94* (2006.01)

(52) U.S. Cl. .................. 429/463; 429/452; 429/458; 429/460; 429/457

(58) Field of Classification Search .................. 429/35, 429/38, 36, 34, 24, 30, 39, 44; *H01M 2/08, H01M 8/02, 8/04, 8/10*
See application file for complete search history.

(56) References Cited

U.S. PATENT DOCUMENTS

| 5,284,718 A | * | 2/1994 | Chow et al. ................ 429/26 |
| 6,790,552 B2 | * | 9/2004 | Kobayashi et al. ........... 429/30 |
| 7,572,539 B2 | * | 8/2009 | Kobayashi et al. ........... 429/35 |

(Continued)

FOREIGN PATENT DOCUMENTS

JP   1-60899   6/1984

(Continued)

OTHER PUBLICATIONS

Machine translation of Chisawa et al (JP11-204122).*

*Primary Examiner*—Melvin C Mayes
*Assistant Examiner*—Jun Li
(74) *Attorney, Agent, or Firm*—McDermott Will & Emery LLP

(57) ABSTRACT

The invention provides an MEA-gasket assembly (1) comprising: an MEA (5) having a polymer electrolyte membrane (5A), catalyst layers and gas diffusing layers (5C); a plate-like frame (6) which is joined to a portion of the polymer electrolyte membrane (5A) so as to enclose the MEA (5), the portion being located in a peripheral region of the MEA (5) and which has a plurality of fluid manifold holes (12, 13, 14); and an annular gasket (7) formed on both faces of the frame (6), wherein an annular gap formed between the inner peripheral edge of the annular gasket (7) and the outer peripheral edges of the gas diffusing layers (5C) is at least partially closed.

7 Claims, 17 Drawing Sheets

U.S. PATENT DOCUMENTS

| | | | |
|---|---|---|---|
| 2001/0044042 A1 | 11/2001 | Inoue et al. | |
| 2004/0115509 A1 | 6/2004 | Yoshida et al. | |
| 2004/0140201 A1* | 7/2004 | Horikawa | 204/242 |
| 2004/0159543 A1* | 8/2004 | Boyer et al. | 204/254 |
| 2005/0084734 A1* | 4/2005 | Kobayashi et al. | 429/35 |

FOREIGN PATENT DOCUMENTS

| | | |
|---|---|---|
| JP | 5-242897 | 9/1993 |
| JP | 10-199551 | 7/1998 |
| JP | 11-204122 | 7/1999 |
| JP | 2001-118592 | 4/2001 |
| JP | 2001-319667 | 11/2001 |
| JP | 2002-42838 | 2/2002 |
| JP | 2002-83614 | 3/2002 |
| JP | 2004-6419 | 1/2004 |
| JP | 2004-119121 | 4/2004 |

* cited by examiner

MEA-GASKET ASSEMBLY AND POLYMER ELECTROLYTE FUEL CELL USING SAME

RELATED APPLICATIONS

This application is the U.S. National Phase under 35 U.S.C. §371 of International Application No. PCT/JP2005/018517, filed on Oct. 6, 2005, which in turn claims the benefit of Japanese Application No. 2004-296702, filed on Oct. 8, 2004, the disclosures of which Applications are incorporated by reference herein.

TECHNICAL FIELD

The present invention relates to an MEA (Membrane-Electrode-Assembly)-gasket assembly and a polymer electrolyte fuel cell, and more particularly to an MEA-gasket assembly having manifold holes and a polymer electrolyte fuel cell using the same.

BACKGROUND ART

FIG. 16 is a partially exploded perspective view showing the structure of a prior art polymer electrolyte fuel cell.

As illustrated in FIG. 16, the polymer electrolyte fuel cell 100 is composed of cells 10 stacked therein.

Although not shown in FIG. 16, a current collecting plate, an insulating plate and an end plate are mounted on the outermost cells located at both ends of the cell stack 10. The cells 10 are fastened with fastening bolts that pass through bolt holes 4 and nuts (not shown).

Each cell 10 is composed of an MEA-gasket assembly 1 that is sandwiched between a pair of separators, i.e., an anode separator 2 and a cathode separator 3 (herein, these are generically called "separators").

The MEA-gasket assembly 1 is formed such that a polymer electrolyte membrane constituting the peripheral region of an MEA 5 is sandwiched between a pair of gaskets 60 made of fluorocarbon rubber. Specifically, the MEA 5 is comprised of the polymer electrolyte membrane having main faces on each of which a catalyst layer and a gas diffusing layer 5C are formed. In the MEA 5, the polymer electrolyte membrane projectingly extends outwardly from the catalyst layers and the gas diffusing layers 5C. The gaskets 60 are joined so as to hold the extending portion of the polymer electrolyte membrane between. Accordingly, the gas diffusing layers 5C are exposed through the central openings, respectively, of the gaskets 60 of the MEA-gasket assembly 1.

In the peripheral regions of the separators 2, 3 and the MEA-gasket assembly 1, reducing gas manifold holes 12, 22, 32 and oxidizing gas manifold holes 13, 23, 33 are provided, such that a pair of manifolds through which reducing gas flows and a pair of manifolds through which oxidizing gas flows are formed, when the cells 10 are assembled. Water manifold holes 14, 24, 34 are also provided so as to form a pair of manifolds through which water flows.

In the inner main face of the anode separator 2, a groove-like reducing gas passage 21 is formed so as to connect the pair of reducing gas manifold holes 22,22 to each other.

In the inner main face of the cathode separator 3, a groove-like oxidizing gas passage 31 is provided so as to connect the pair of oxidizing gas manifold holes 33,33 to each other.

Although not shown in FIG. 16, the outer main faces (backside) of the separators 2, 3 are respectively provided with a groove-like water passage that connects the pair of water manifold holes 24 (34) to each other, similarly to the reducing gas passage 21 and the oxidizing gas passage 31.

When the cells 10 are stacked, the oxidizing gas, reducing gas and water manifold holes are respectively aligned, thereby forming a pair of oxidizing gas manifolds, a pair of reducing gas manifolds and a pair of water manifolds. The flowing routes of the oxidizing gas, reducing gas and water are respectively formed such that each fluid flows from one manifold (i.e., the supply side manifold) to the other manifold (i.e., the discharge side manifold), while diverging to the passage 21, passage 31 or water passage (not shown) formed on the separators. One face of the exposed portion of the MEA located within the central part of the MEA-gasket assembly 1 is exposed to the oxidizing gas flowing in the oxidizing gas passage 21, and the other face is being exposed to the reducing gas flowing in the reducing gas passage 31, so that an electrochemical reaction occurs. Since water flows in the back faces of the separators 2, 3, that is, between the adjacent cells 10, the polymer electrolyte fuel cell 100 can be kept to a specified temperature appropriate for the electrochemical reaction by the heat transfer ability of the water.

FIG. 17 is an enlarged perspective view showing a section taken along line XVII-XVII of FIG. 16. As illustrated in FIG. 17, a diverging point leading to the reducing gas passage 21 is formed between a reducing gas manifold hole 12 of the MEA-gasket assembly 1 and a reducing gas manifold hole 22 of the anode separator 2. The reducing gas flows into the reducing gas passage 21 in the direction indicated by solid arrow in FIG. 17. The portion of the MEA-gasket assembly 1 located in the diverging point that leads to the reducing gas passage 21 is joined to the cathode separator 3 only and is not pressed from the side of the anode separator 2. In addition, the peripheral region of the MEA-gasket assembly 1 is easily deformed because it is constituted by the gaskets 60 that are made of an elastic material. Accordingly, the sealing performance is poor in the region between the cathode separator 3 and the MEA-gasket assembly 1 and therefore there is a possibility that the reducing gas penetrates from the diverging point into the space between the cathode separator 3 and the MEA-gasket assembly 1 as indicated by dashed arrow of FIG. 17. Alternatively, the oxidizing gas flowing in the oxidizing gas passage 31 defined by the cathode separator 3 and the MEA-gasket assembly 1 may leak to the diverging point. As a result, mixing of the oxidizing gas and the reducing gas, that is the so-called cross-leak phenomenon, occurs, which leads to a possibility of a decrease in the performance of the polymer electrolyte fuel cell 100 and damage to the inside of the polymer electrolyte fuel cell 100. Although not shown in the drawings, the same may happen to the diverging point that leads to the oxidizing gas passage 31, the diverging point being located between an oxidizing gas manifold hole 33 of the cathode separator 3 and an oxidizing gas manifold hole 13 of the MEA-gasket assembly 1. Specifically, since the sealing performance deteriorates in the region between the anode separator 2 and the MEA-gasket assembly 1, the oxidizing gas may penetrate into the space between the anode separator 2 and the MEA-gasket assembly 1, or alternatively, the reducing gas leaks, causing the cross-leak phenomenon of the oxidizing gas and the reducing gas.

As attempts to solve this problem, there have been proposed fuel cells capable of restraining the cross-leak at the diverging points by providing a covering material between the separators 2, 3 and the MEA-gasket assembly 1 (see Patent Document 1) or by forming the oxidizing gas passage 31 and reducing gas passage 21 of the separators 2, 3 in the aforesaid area from holes that pass through the separators 2, 3 (see Patent Document 2).

In addition, the flows of the reducing gas and oxidizing gas between the pair of reducing gas manifold holes 22 and between the pair of oxidizing gas manifold holes 33, which pass through the annular gap around the polymer electrolyte membrane 5A between the inner peripheral edges of the gaskets 60 and the outer peripheral edges of the gas diffusing layers 5C (i.e., the annular gap located around the outer peripheries of the gas diffusing layers 5C), cause a decrease in the oxidizing gas/reducing gas utilization factor and a decrease in the efficiency of the polymer electrolyte fuel cell 100.

Patent Document 1: Publication of Examined Application No. 1-60899

Patent Document 2: Japanese Laid-Open Patent Application Publication No. 2002-83614

THE PROBLEM THAT THE INVENTION IS TO SOLVE

These prior art techniques, however, present disadvantages: Patent Document 1 requires an additional provision of a covering material, whereas Patent Document 2 requires formation of holes in each separator. Accordingly, these techniques involve intricate processing when making the separators. Where the techniques are applied to the manufacture of polymer electrolyte fuel cells that generally have several tens to several hundreds of cells, the assembling process becomes troublesome and the manufacturing cost increases. Thus, the above techniques leave much to be improved.

In order to restrain the decrease of the oxidizing gas/reducing gas utilization factor, a simple structure for shutting off the flows of the reducing gas and oxidizing gas around the outer peripheries of the gas diffusing layers is required.

MEANS FOR SOLVING THE PROBLEMS

The present invention is directed to overcoming the foregoing problems. Therefore, a primary object of the invention is to provide an MEA-gasket assembly and a polymer electrolyte fuel cell using the same, which are capable of restraining a decrease in the gas utilization factor of the polymer electrolyte fuel cell, by restraining the cross-leak of the oxidizing gas and the reducing gas at the diverging points where the gases diverge from the manifold holes to the passages in the inner faces of the separators, and restraining the flows of the reducing gas and the oxidizing gas around the outer peripheries of the gas diffusing layers, with a simple structure while avoiding intricate processing of the separators and additional provision of parts.

In accomplishing the above object, there has been provided, in accordance with a first invention, an MEA-gasket assembly comprising:

an MEA having a polymer electrolyte membrane, a catalyst layer and a gas diffusing layer;

a plate-like frame which is joined to a portion of the polymer electrolyte membrane so as to enclose the MEA, the portion being located in a peripheral region of the MEA, and which has a plurality of fluid manifold holes; and an annular gasket formed of an elastic body formed on both faces of the frame;

wherein an annular gap formed between an inner peripheral edge of the annular gasket and an outer peripheral edge of the gas diffusing layer is at least partially closed.

In this arrangement, since the frame of the MEA-gasket assembly has rigidity, the annular gasket is pressed against the cathode separator and the anode separator by the pressing force of the frame when the cell is in its assembled condition even at the diverging points where gases diverge from the manifold holes into the passages in the inner faces of the separators. Therefore, penetration of the reducing gas or oxidizing gas into the space between the contact faces of the cathode or anode separator and the MEA-gasket assembly can be restrained. Further, the oxidizing gas flowing in the oxidizing gas passage of the cathode separator or the reducing gas flowing in the reducing gas passage of the anode separator can be restrained from leaking to its associated diverging point. Specifically, the possibility of mixing of the oxidizing gas and the reducing gas, that is the so-called cross-leak phenomenon, can be reduced with a simple structure without involving intricate processing of the separators and additional use of parts. In addition, the annular gap formed between the inner peripheral edge of the annular gasket and the outer peripheral edge of the gas diffusing layer is at least partially closed so that the reducing gas and oxidizing gas can be restrained from flowing in the gap located around the outer periphery of the gas diffusing layer with a simple structure. Therefore, the oxidizing gas/reducing gas utilization factor and, in consequence, the gas utilization factor of the polymer electrolyte fuel cell can be restrained from decreasing.

There has been provided, in accordance with a second invention, an MEA-gasket assembly, wherein the inner peripheral edge of the annular gasket and the outer peripheral edge of the gas diffusing layer are at least partially in contact with each other such that the annular gap is at least partially closed.

With this arrangement, the effect of the first aspect of the invention can be obtained without additional use of parts.

There has been provided, in accordance with a third invention, an MEA-gasket assembly further comprising:

an annular member formed of an elastic body disposed between the annular gasket and the gas diffusing layer;

wherein the outer peripheral edge of the annular member is at least partially in contact with the inner peripheral edge of the annular gasket and the inner peripheral edge of the annular member is at least partially in contact with the outer peripheral edge of the gas diffusing layer such that the annular gap is at least partially closed.

With this arrangement, the area of the annular gap formed between the outer peripheral edge of the gas diffusing layer and the inner peripheral edge of the annular gasket is reduced by the annular member, so that a leak of the oxidizing gas or reducing gas to the outer periphery of the gas diffusing layer and, in consequence, a decrease in the gas utilization factor of the polymer electrolyte fuel cell can be restrained. In addition, the annular member divides the annular gap formed between the outer peripheral edge of the gas diffusing layer and the inner peripheral edge of the annular gasket into two parts, that is, two co-planer annular gaps. Therefore, in the annular gaps thus divided, the partial joining of the outer peripheral edge of the annular member and the inner peripheral edge of the annular gasket and the partial joining of the inner peripheral edge of the annular member and the outer peripheral edge of the gas diffusing layer are easily accomplished.

There has been provided, in accordance with a fourth invention, an MEA-gasket assembly, wherein the inner peripheral edge of the annular gasket is thermally fused into the outer peripheral edge of the gas diffusing layer.

This ensures secure joining of the inner peripheral edge of the annular gasket and the outer peripheral edge of the gas diffusing layer, so that the effect of the second invention can be more reliably obtained.

There has been provided, in accordance with a fifth invention, an MEA-gasket assembly wherein the inner peripheral edge of the annular member is thermally fused into the outer peripheral edge of the gas diffusing layer and the outer peripheral edge of the annular member and the inner peripheral edge of the annular gasket are at least partially thermally fused and adhered to each other.

This ensures secure joining of the inner peripheral edge of the annular member and the outer peripheral edge of the gas diffusing layer and secure joining of the outer peripheral edge of the annular member and the inner peripheral edge of the annular gasket, so that the effect of the third invention can be more reliably obtained.

There has been provided, in accordance with a sixth invention, an MEA-gasket assembly wherein the frame is made of a thermoplastic resin, the annular gasket is made of a thermoplastic elastic material, the frame and the annular gasket contain the same plastic component, and the annular gasket is thermally fused and adhered to both faces of the frame.

With this arrangement, the annular gasket is fused and integrally adhered to the frame when forming the annular gasket on the frame by molding, so that a joint structure can be easily attained without employing a special structure exclusively used for joining of these parts.

There has been provided, in accordance with a seventh invention, an MEA-gasket assembly wherein the frame has a compressive elasticity modulus of not less than 2,000 MPa and not more than 200,000 MPa, and the annular gasket has a compressive elasticity modulus of more than 0 MPa and not more than 200 MPa.

By setting the rigidity of the frame and the elasticity of the annular gasket to the above values, the oxidizing gas/reducing gas utilization factor can be properly restrained from decreasing. The compressive elasticity modulus used herein is measured by the compressive elasticity modulus measuring method specified by JIS-K7181.

There has been provided, in accordance with an eighth invention, a polymer electrolyte fuel cell wherein one or more cells are stacked, each cell having the MEA-gasket assembly comprising: an MEA having a polymer electrolyte membrane, a catalyst layer and a gas diffusing layer; a plate-shaped frame which is joined to a portion of said polymer electrolyte membrane so as to enclose said MEA, said portion being located in a peripheral region of said MEA, and which has a plurality of fluid manifold holes; an annular gasket formed of an elastic body formed on both faces of said frame; wherein an annular gap formed between an inner peripheral edge of said annular gasket and an outer peripheral edge of said gas diffusing layer is at least partially closed; an annular member formed of an elastic body disposed between said annular gasket and said gas diffusing layer; wherein the outer peripheral edge of said annular member is at least partially in contact with the inner peripheral edge of said annular gasket and the inner peripheral edge of said annular member is at least partially in contact with the outer peripheral edge of said gas diffusing layer such that said annular gap is at least partially closed, and an anode separator and a cathode separator which are disposed so as to sandwich the MEA-gasket assembly between, wherein the anode separator and the cathode separator respectively have fluid manifold holes at positions corresponding to the plurality of fluid manifold holes provided in the MEA-gasket assembly, and wherein the anode separator and the cathode separator respectively have a fluid passage groove in the inner faces thereof to connect at least a pair of fluid manifold holes each other.

With this arrangement, since the frame in the MEA-gasket assembly has rigidity, the annular gasket is pressed against the cathode separator and the anode separator by the pressing force of the frame even at diverging points where fluids diverge from the manifold holes of the separators into the passages in the inner faces of the separators. Therefore, penetration of the reducing gas or oxidizing gas into the space between the contact faces of the cathode or anode separator and the MEA-gasket assembly can be restrained. Further, the oxidizing gas flowing in the oxidizing gas passage of the cathode separator or the reducing gas flowing in the reducing gas passage of the anode separator is restrained from leaking to the diverging point. Thereby, the possibility of mixing of the oxidizing gas and the reducing gas, that is the so-called cross-leak phenomenon, can be reduced with a simple structure without involving intricate processing of the separators and additional use of parts. In addition, the annular gap formed between the inner peripheral edge of the annular gasket and the outer peripheral edge of the gas diffusing layer is at least partially closed so that the reducing gas and oxidizing gas can be restrained from flowing in the gap located around the outer periphery of the gas diffusing layer with a simple structure. Therefore, the oxidizing gas/reducing gas utilization factor and, in consequence, the gas utilization factor of the polymer electrolyte fuel cell can be restrained from decreasing. These objects as well as other objects, features and advantages of the invention will become apparent to those skilled in the art from the following detailed description of preferred embodiments with reference to the accompanying drawings.

EFFECT OF THE INVENTION

As has been described hereinabove, the MEA-gasket assembly and the polymer electrolyte fuel cell using the same according to the invention have the effect of restraining the cross-leak of the oxidizing gas and the reducing gas at the diverging points where the gases diverge from the manifold holes to the passages within the inner faces of the separators, and restraining the flows of the reducing gas and the oxidizing gas around the outer periphery of the gas diffusing layer with a simple structure, while avoiding intricate processing of the separators and additional use of parts.

BRIEF DESCRIPTION OF DRAWINGS

FIG. 1 is views illustrating a structure of an MEA-gasket assembly according a first embodiment, wherein

FIG. 3 is views illustrating a structure of a frame/polymer electrolyte membrane assembly that is a basic structure of the MEA-gasket assembly shown in FIG. 1, wherein

FIG. 5 is views illustrating a structure of the frame/polymer electrolyte membrane assembly shown in FIG. 4 in which a first gasket is formed, wherein

FIG. 6 is views illustrating a structure of the frame/polymer electrolyte membrane assembly shown in FIG. 5 in which catalyst layers and gas diffusing layers are formed on the main surfaces of the polymer electrolyte membrane, wherein

FIG. 15 is views illustrating a structure of an MEA-gasket assembly according to a fourth embodiment, wherein

EXPLANATION OF REFERENCE NUMERALS

Figure 1A:
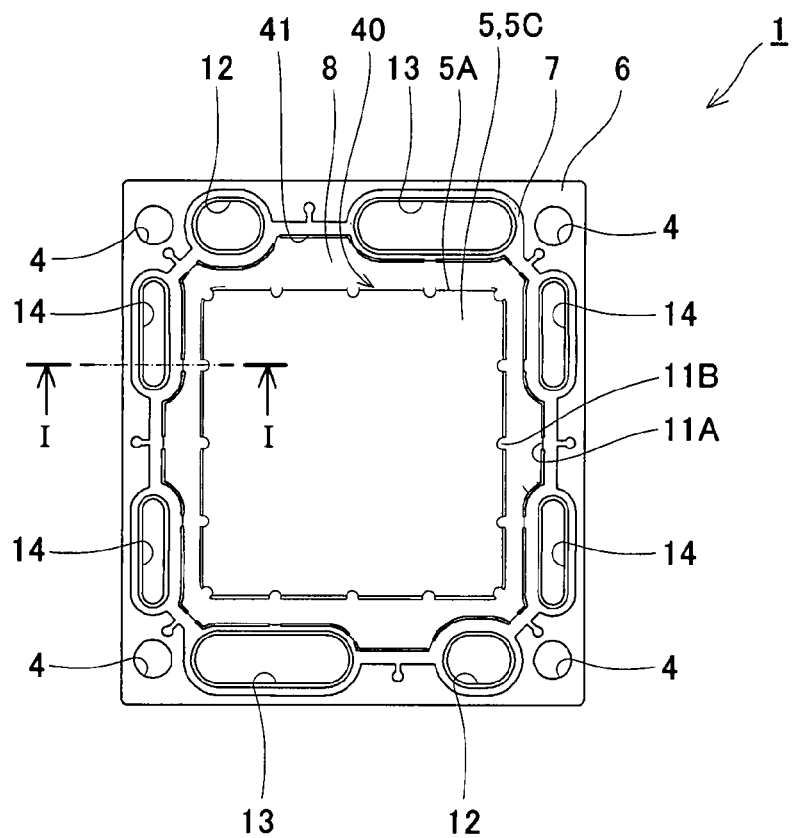
FIG. 1(a) is a plan view (cathode separator side) and FIG. 1(b) is a sectional view taken along line I-I of FIG. 1(a).

1: MEA-gasket assembly
2: anode separator
3: cathode separator
4: bolt hole
5: MEA
5A: polymer electrolyte membrane
5B: catalyst layer
5C: gas diffusing layer
6: frame
6A: through holes for joining
6B: through holes for molding
6C: first molded member
6D: second molded member
6E: recess
7: first gasket
7A: main body section
7B: coupling section
7C: rib
8: second gasket
9: sealing member
10: cell
11: joint portion
11A: outer joint section
11B: inner joint section
12, 22, 32: reducing gas manifold hole
13, 23, 33: oxidizing gas manifold hole
14, 24, 34: water manifold hole
21: reducing gas passage
31: oxidizing gas passage
40: outer gap
41: inner gap
60: gasket
100: polymer electrolyte fuel cell
ΔP: pressure loss
Q: reducing gas flow rate
R: reducing gas utilization factor
V: average cell voltage

BEST MODE FOR CARRYING OUT THE INVENTION

Referring now to the accompanying drawings, the best mode for carrying out the invention will be described below.

First Embodiment

Figure 1B:
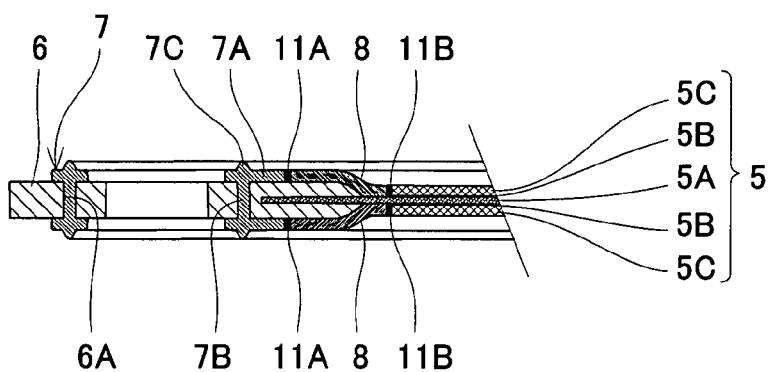

FIG. 1 is a view illustrating a structure of an MEA-gasket assembly according a first embodiment, wherein FIG. 1(a) is a plan view (cathode separator side) and FIG. 1(b) is a sectional view taken along line I-I of FIG. 1(a).

As illustrated in FIG. 1, the MEA-gasket assembly 1 of the first embodiment has an MEA 5. In the MEA 5, a catalyst layer 5B and a gas diffusing layer 5C are stacked in order on each surface of a part (inner part) of a polymer electrolyte membrane 5A, the part excluding the peripheral region (periphery) of the membrane 5A.

An annular frame 6 (in this embodiment, the frame takes the form of a substantially square plate) is provided so as to hold the peripheral region of the polymer electrolyte membrane 5A of the MEA 5 and to enclose the outer peripheral edge of the polymer electrolyte membrane 5A. Herein, the frame 6 is made of plastic resin. The frame 6 is disposed such that an annular gap is formed between the inner peripheral edge of the frame 6, and the outer peripheral edges of the catalyst layer 5B and the gas diffusing layer 5C of the MEA 5. Herein, the thickness of the frame 6 is substantially the same as that of the portion of the MEA 5 where the catalyst layer 5B and the gas diffusing layer 5C are formed. In the frame 6, a plurality of manifold holes, which are a pair of reducing gas manifold holes 12, a pair of oxidizing gas manifold holes 13 and two pairs of water manifold holes 14, are formed so as to pass through the frame 6 in a thickness-wise direction thereof.

A first gasket (annular gasket) 7 made of an elastic body is provided for the frame 6. The first gasket 7 is composed of a pair of plate-like main body sections 7A,7A that cover specified portions of both main surface of the frame 6 and column-like coupling section 7B for coupling the pair of main body section 7A,7A to each other. Each main body section 7A is formed so as to annularly extend in a circumferential direction of the frame 6, enclosing the pair of reducing gas manifold holes 12, the pair of oxidizing gas manifold holes 13, and the two pairs of water manifold holes 14. Herein, the main body sections 7A are provided with ribs 7C that extend in the extending direction of the main body sections 7A. Thereby, the ribs 7C come into contact with an anode separator 2 and a cathode separator 3 respectively, properly sealing the manifold holes 12 to 14 and the gas diffusing layers 5C, when the MEA-gasket assembly 1 is joined to the anode separator 2 and the cathode separator 3, that is, in the condition where the cell is assembled. In addition, the main body sections 7A are apart from the inner peripheral edge of the frame 6. The portions of the frame 6, which are covered with the main body section 7A of the first gasket 7, are provided with coupling holes 6A that are positioned in place so as to pass through the frame 6 in a thickness-wise direction thereof. The pair of main body section 7A are connected each other by the coupling sections 7B which are provided so as to occupy the through holes for joining 6A.

On the main faces of the MEA-gasket assembly 1, a pair of second gaskets (annular member) 8 are disposed. The second gasket 8 is provided so as to supply a gap located around the outer periphery of the gas diffusion layer 5C on the each face of the MEA-gasket assembly 1. More specifically, the second gaskets 8 supply annular gaps defined by both faces of a portion of the annular frame 6 and both faces of a portion of the annular polymer electrolyte membrane 5A, this portion of the frame 6 is located at inner side of the main body section 7A of the first gasket 7, and this portion of the membrane 5A is located between the inner peripheral edge of the frame 6 and the outer peripheral edge of the gas diffusing layer 5C. The second gasket 8 is made from an elastic body. The second gasket 8 is formed in the shape of an annular plate (herein, a substantially square hollow shape), and placed so as to create an annular gap (herein referred to as "outer gap") 40 located around the inner peripheral edge of the main body section 7A of the first gasket 7 and an annular gap (herein referred to as "inner gap") 41 located around the outer peripheral edge of the gas diffusing layer 5C. Thereby, the annular gap between the first gasket 7 and the gas diffusion layer 5C is reduced and split by the second gasket 8.

The annular outer gap 40 and inner gap 41 are partially closed by outer joint section 11A and inner joint section 11B respectively. The outer joint section 11A and the inner joint section 11B are formed by partially melting the second gasket 8 so as to run into the outer gap 40 and the inner gap 41 respectively.

The MEA-gasket assembly 1 of the above structure is such that its outer part where is provided with the frame 6 and the first gasket 7 is thicker than its inner part where is provided with the gas diffusing layers 5C of the MEA 5. The MEA-gasket assembly 1 is substantially square in plan and has bolt holes 4 at the four corners thereof.

Figure 16:
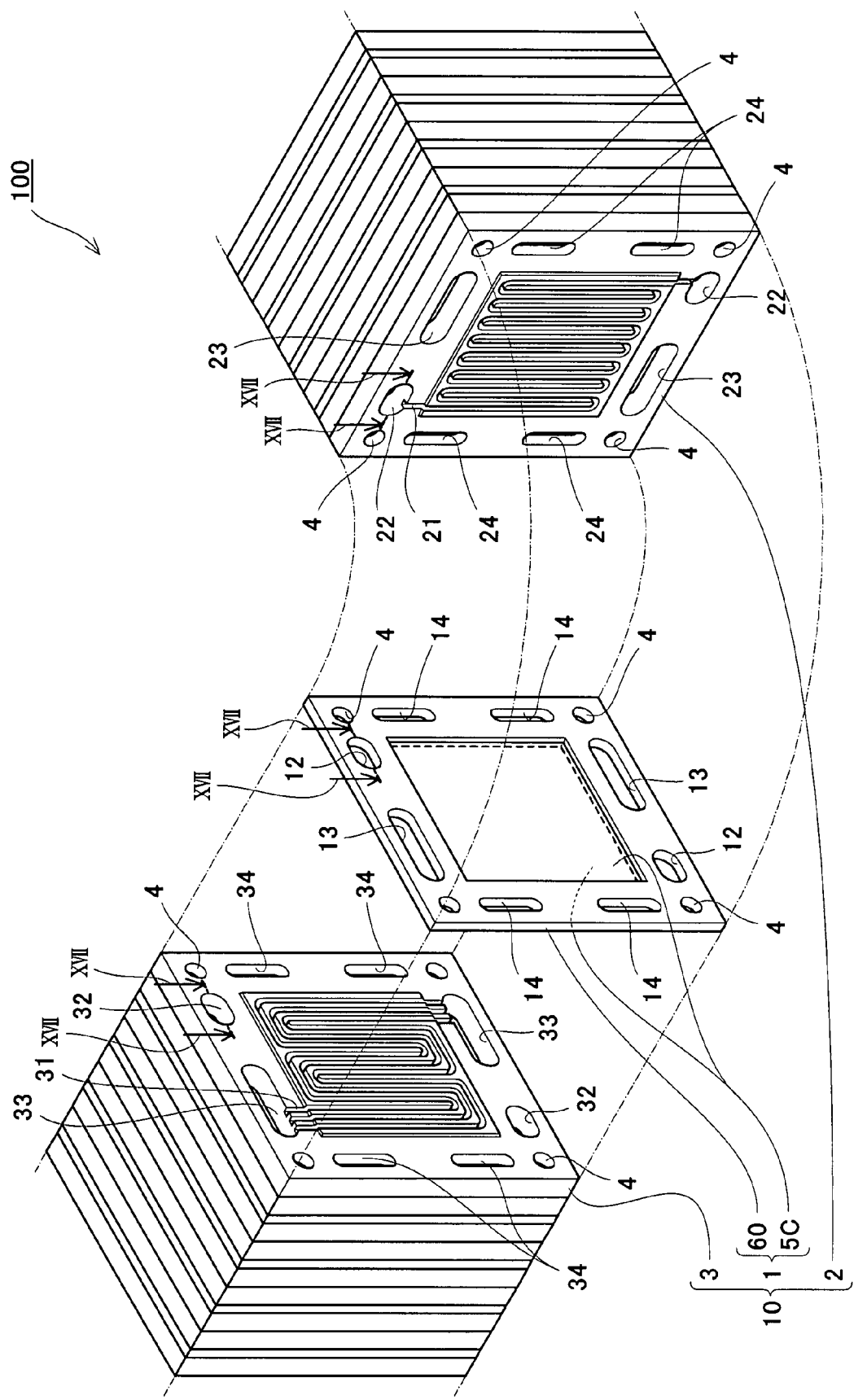
FIG. 16 is a partly exploded perspective view showing the structure of a prior art polymer electrolyte fuel cell.

Herein, the cell 10 having the MEA-gasket assembly 1 is formed by stacking the MEA-gasket assembly 1, the anode separator 2 and the cathode separator 3, in a manner similar to that of the prior art polymer electrolyte fuel cell (see FIG. 16). The cells 10 are then stacked thereby forming the polymer electrolyte fuel cell.

Figure 2:
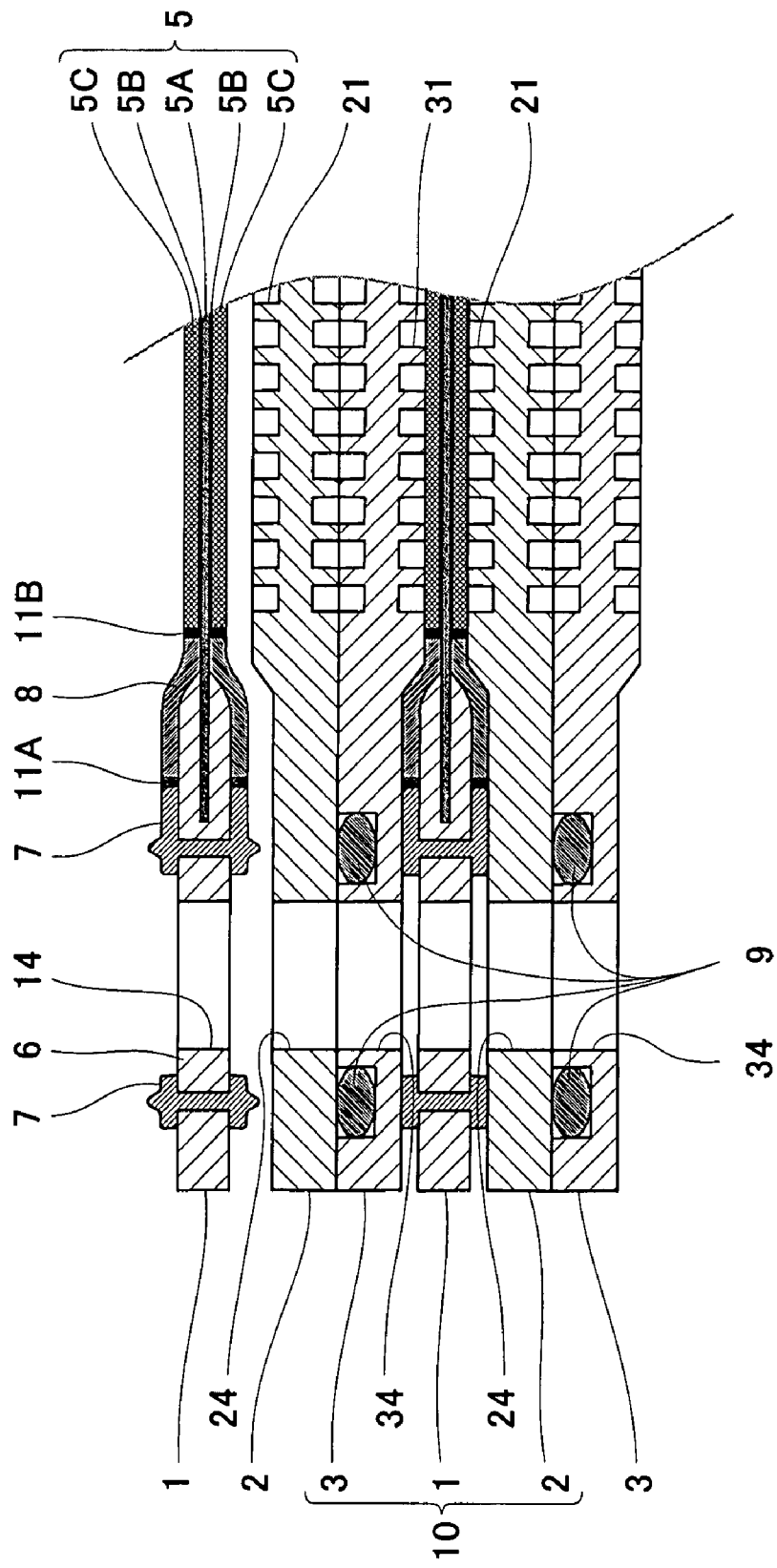
FIG. 2 is a sectional view illustrating a section of a stack of cells 10 taken along line I-I of FIG. 1(a).

FIG. 2 is a sectional view illustrating the section of a stack of cells 10 and taken along line I-I of FIG. 1(a).

The anode separator 2 and the cathode separator 3 have the shape of a flat plate. Their surfaces in contact with the MEA-gasket assembly 1 respectively have, at their centers, a trapezoidal step corresponding to the shape of the MEA-gasket assembly 1 and, more specifically, to the step caused by the difference in thickness between the frame 6 and the MEA 5. The anode separator 2 and the cathode separator 3 are made of (3 mm-thick) glassy carbon produced by Tokai Carbon Company, Ltd. The manifold holes 22, 23, 24, 32, 33, 34 of the separators 2 and 3, the bolt holed 4, the groove-like reducing gas passage 21, the groove-like oxidizing gas passage 31, etc. are formed by cutting work.

Sixty cells 10 are stacked and fastened by a fastening power of 10KN, using bolts and nuts which are inserted into the bolt holes 4.

Since the second gasket 8 is an elastic body, when assembling the cell 10, the second gasket 8 is deformed and brought into contact with the frame 6 and the separators 2, 3 by pressing the separators 2, 3 against the MEA-gasket assembly 1, and the gasket 8 is elongated so as to narrow the outer gap 40 and the inner gap 41.

The first gasket 7 is brought into pressure contact with the separators 2, 3, thereby sealing the areas around the water manifold holes 14, 24, 34. Although not shown in the drawings, the first gasket 7 seals the areas around the reducing gas manifold holes 12, 22, 32 and the oxidizing manifold holes 13, 23, 33 in the similar manner.

The first gasket 7 and the second gaskets 8 seal the area around the gas diffusing layers 5C.

On the outer faces of the anode separator 2 and cathode separator 3, commonly-used sealing members 9 such as squeezed packing made of heat-resisting material are provided in the areas around the manifold holes. With this arrangement, leaks of the reducing gas, oxidizing gas and water from the contact areas around the manifold holes between the adjacent cells 10 can be prevented.

Next, a manufacturing method of the MEA-gasket assembly 1 will be explained.

First of all, the frame 6 is joined to the peripheral region of the polymer electrolyte membrane 5A.

Figure 3A:
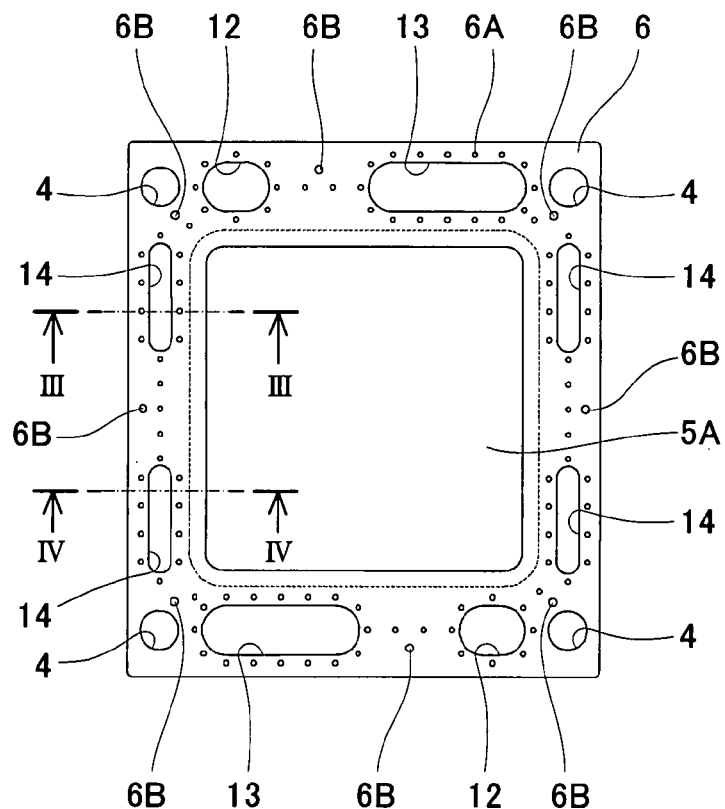
FIG. 3(a) is a plan view and FIG. 3(b) is a sectional view taken along line III-III of FIG. 3(a).
Figure 3B:
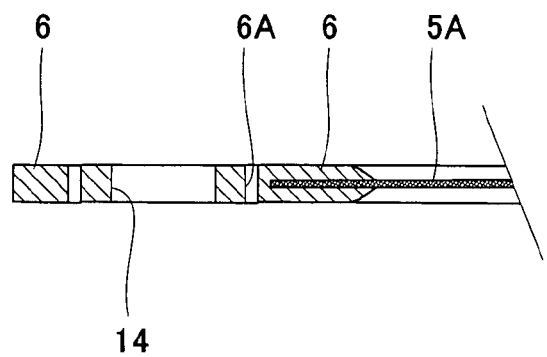

FIG. 3 is views illustrating a structure of a frame/polymer electrolyte membrane assembly that is a basic structure of the MEA-gasket assembly shown in FIG. 1, wherein FIG. 3(a) is a plan view and FIG. 3(b) is a sectional view taken along line III-III of FIG. 3(a).

The frame 6 is joined to the polymer electrolyte membrane 5A so as to hold the peripheral region of the polymer electrolyte membrane 5A between. Specifically, the frame 6 is in the form of a rectangular flat plate having an opening at the center thereof. The frame 6 is provided with the pair of reducing gas manifold holes 12, the pair of oxidizing gas manifold holes 13, the two pairs of water manifold holes 14, and the four bolt holes 4 located in the vicinity of the corners of the frame 6, these holes passing through the frame 6 in thickness-wise directions of the frame 6. The frame 6 is also provided with through holes for joining 6A and through holes for molding 6B which are used for the molding of the first gasket 7 described later. In this embodiment, the frame 6 is in the form of a rectangular flat plate having an outside dimension of 200×180 mm and a 124×124 mm opening 26. The thickness of the frame 6 is 0.8 mm.

The frame 6 is made of a material that is chemically clean, stable, and that has appropriate elasticity modulus and relatively high deflection temperature under load, at temperatures equal to and lower than the operating temperature of the polymer electrolyte fuel cell. Concretely, where the reducing gas passage 21 and oxidizing gas passage 31 of the separators 2, 3 are about 1 to 2 mm in width, and the frame 6 is approximately 1 mm or less in thickness, the compressive elasticity modulus of the material of the frame 6 is preferably at least 2000 MPa or more. The elasticity modulus stated herein is the compressive elasticity modulus measured by the compressive elasticity modulus measurement stipulated by JIS-K7181. Since the operating temperature of the polymer electrolyte fuel cell is normally up to 90° C., the deflection temperature under load of the frame 6 is preferably 120° C. or more. More concretely, in cases where the frame 6 is made of resin material, not non-crystalline resins but crystalline resins are preferable in view of chemical stability. Among crystalline resins, those having great mechanical strength and heat resistance are preferable. For instance, crystalline resins of the super engineering plastic grade are suitably used. Examples of such preferable resins are polyphenylene sulfide (PPS), polyether ether ketone (PEEK), liquid crystalline polymer (LCP), and polyether nitryl (PEN) which have elasticity moduli of several thousands to several thousands of hundreds MPa and deflection temperatures under load of 150° C. or more.

Although polypropylene filled with a glass filler (GFPP) is a general purpose resin material, it is a suitable material because it has an elasticity modulus several times higher than that of unfilled polypropylene (having a compressive elasticity modulus of about 1000 to 1500 MPa) and a deflection temperature under load of nearly 150° C. In this embodiment, PPS filled with glass filler (produced by Dainippon Ink and Chemicals Incorporated and marketed under the trade name of DIC-PPS, FX 1140-Bs), which is a thermoplastic resin, is used. As the polymer electrolyte membrane 5A, the perfluorocarbon sulfonic acid membrane (produced by Dupont and marketed under the trade name of Nafion 117®) having an outer dimension of 140 mm×140 mm and thickness of 50 μm is used.

Figure 4:
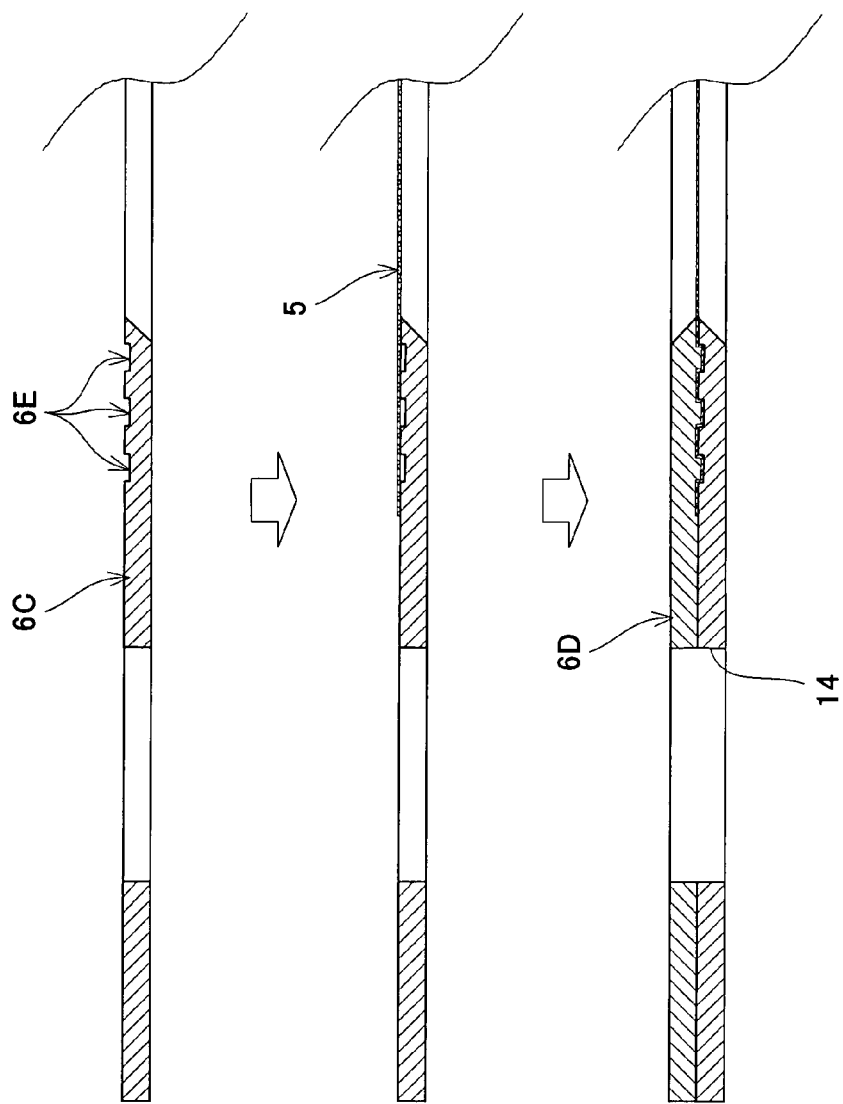
FIG. 4 is sectional views taken along line IV-IV of FIG. 3(a), which schematically illustrate a molding process for the frame/polymer electrolyte membrane assembly.

FIG. 4 is sectional views taken along line IV-IV of FIG. 3(a), which schematically illustrate a molding process for the frame/polymer electrolyte membrane assembly.

Joining of the frame 6 to the polymer electrolyte membrane 5A is carried out by an insert molding utilizing the double molding technique. As shown in FIG. 4, only a half of the frame 6 when viewed in its thickness-wise direction is molded (a first molded member 6C). At that time, in the first molded member 6C, recesses 6E having a depth of 0.2 mm, width of 0.5 mm and pitch of 1 mm are formed around the entire circumference of the opening, as illustrated in FIG. 4.

Next, as illustrated in FIG. 4, the polymer electrolyte membrane 5A is placed so as to cover the opening of the first molded member 6C. At that time, the peripheral region of the polymer electrolyte membrane 5A is laid over the recesses 6E.

As illustrated in FIG. 4, the remaining half (second molded member 6D) of the frame 6 when viewed in its thickness-wide direction is injection-molded.

At that time, the peripheral region of the polymer electrolyte membrane 5A is fused and adhered to the resin of the second molded member 6D and first molded member 6C by the heat of the second molded member 6D, and the polymer electrolyte membrane 5A is deformed along the recesses of the first molded member 6C by the injection pressure of the second molded member 6D. Thereby, the polymer electrolyte membrane 5A is joined to the frame 6. It should be noted that the joining form of the polymer electrolyte membrane 5A and the frame 6 is omitted from other drawings than FIG. 4 for simplicity.

In this embodiment, after the molding of the first molded member 6C, the first molded member 6C is moved to another die, and an injection molding is carried out. However, the first molded member 6C and the second molded member 6d can be successively molded within a single die if a slide die or rotary die is used. This simplifies the process and leads to an improvement in the mass productivity of the MEA-gasket assembly 1.

Next, the first gasket 7 is joined to both main faces of the frame 6.

The first gasket 7 is made of a material that is chemically stable and has such high hot-water resistance that hydrolytic cleavage does not occur, at temperatures equal to and lower than the operating temperature of the polymer electrolyte fuel cell. The compressive elasticity modulus of the first gasket 7 is preferably 200 MPa or less. Thereby, good sealing properties can be ensured for the polymer electrolyte fuel cell under the fastening load. In this embodiment, a thermoplastic elastic material is used. More particularly, Santoprene 8101-55 (produced by Advanced Elastomer Systems), which is a polyolefin-based thermoplastic elastic material, is used.

Preferably, the compressive elasticity modulus of the frame 6 is not less than 2,000 MPa and not more than 200,000 MPa, whereas the compressive elasticity modulus of the first gasket 7 is preferably more than 0 MPa and not more than 200 MPa. Experience shows that mixing of the oxidizing gas and the reducing gas, which is, the so-called cross leak phenomenon can be restrained by setting the rigidity of the frame 6 and the elasticity of the first gasket 7 to the above values.

In this embodiment, first gasket 7 is simultaneously injection-molded on both main faces of the first gasket 7, using first gasket molding dies. As illustrated in FIG. 2, many through holes for joining 6A are provided on the surfaces of the frame 6 where the first gasket 7 are formed. Four through holes for molding 6B are provided. The through holes for molding 6B are used as gates for injection molding to control molding conditions such as injection pressure, injection speed and die temperature, so that the first gasket 7 can be formed on both main faces of the frame 6 without causing insufficient injection, while restraining deformation of the main faces of the frame 6.

Figure 5A:
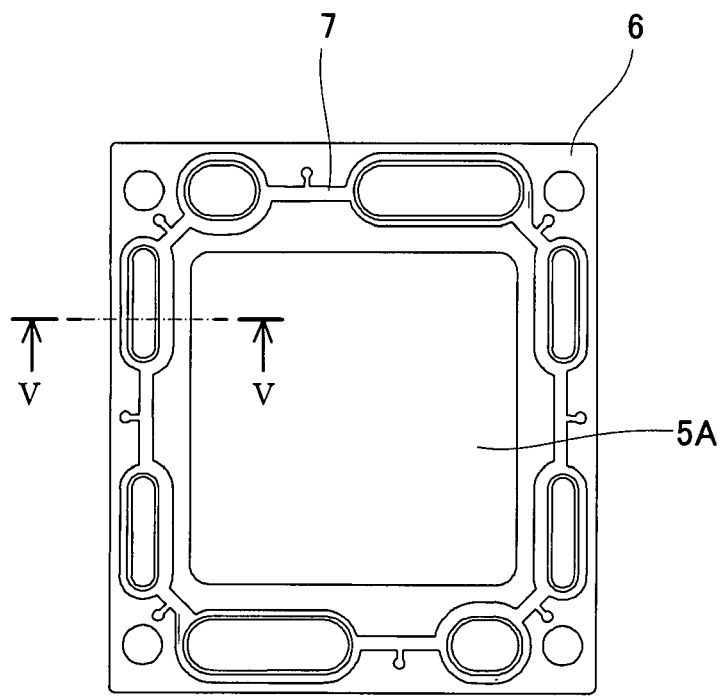
FIG. 5(a) is a plan view and FIG. 5(b) is a sectional view taken along line V-V of FIG. 5(a).
Figure 5B:
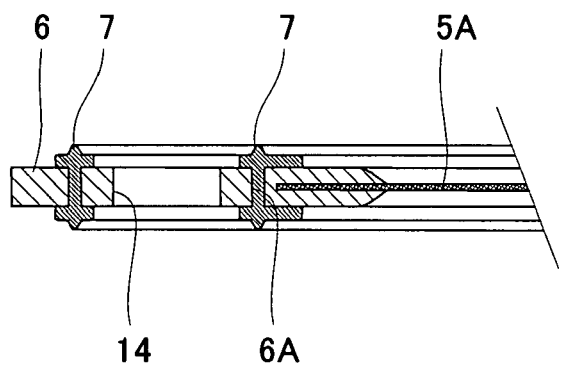

FIG. 5 is views illustrating a structure of the frame/polymer electrolyte membrane assembly shown in FIG. 3 in which a first gasket is formed, wherein FIG. 5(a) is a plan view and FIG. 5(b) is a sectional view taken along line V-V of FIG. 5(a).

On both main faces of the frame 6, the first gasket 7 made of a thermoplastic elastic material is formed so as to be joined to the frame 6. Concretely, as shown in FIG. 5, the material of the first gasket 7 flows into the through holes for joining 6A provided in the frame 6. Thereby, the first gaskets 7 formed on both faces of the frame 6 are coupled to each other in the through holes for joining 6A, so that the first gasket 7 is securely joined to the frame 6. Although the mold shrinkage factor of the elastic material (Santoprene 8101-55) used for molding the first gasket 7 in this embodiment is as great as 20/1000, secure joining can be realized. Alternatively, the material of the first gasket 7 may include the same plastic component as of the frame 6. In this case, there is no need to provide the through holes for joining 6A, because the frame 6 and the first gasket 7 are thermally fused and adhered to each other, thereby ensuring great joining strength.

Next, the catalyst layer 5B and the gas diffusing layer 5C are formed on each main face of the polymer electrolyte membrane 5A.

Figure 6A:
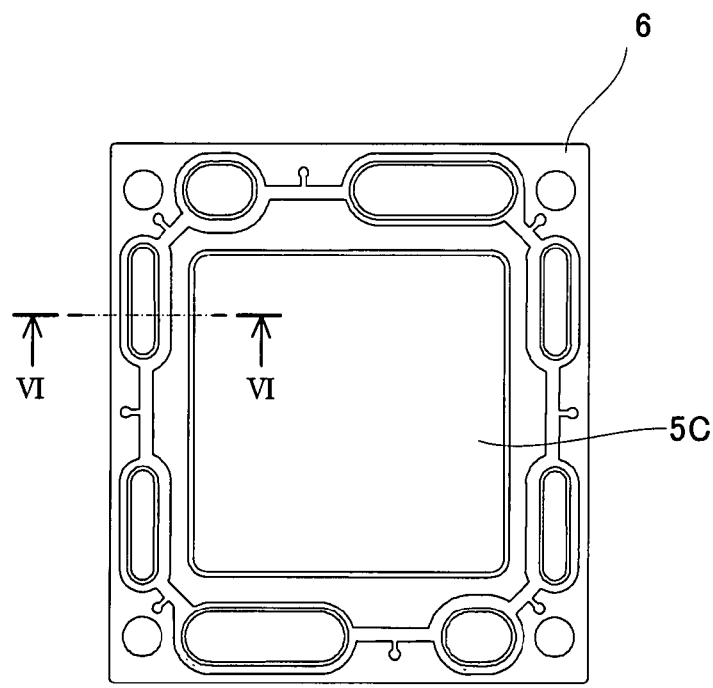
FIG. 6(a) is a plan view and FIG. 6(b) is a sectional view taken along line VI-VI of FIG. 6(a).
Figure 6B:
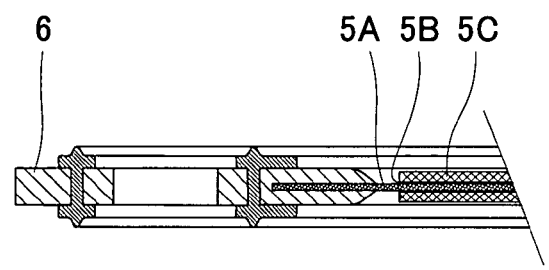

FIG. 6 is views illustrating a structure of the frame/polymer electrolyte membrane assembly shown in FIG. 5 in which the catalyst layers 5B and the gas diffusing layers 5C are formed on the main faces of the polymer electrolyte membrane 5A, wherein FIG. 6(a) is a plan view and FIG. 6(b) is a sectional view taken along line VI-VI of FIG. 6(a).

In this embodiment, the catalyst layer 5B is firstly formed in the following way.

Platinum is supported on Ketjen Black EC (furnace black produced by KETJENBLACK INTERNATIONAL Co., Ltd. Specific surface area: 800 $m^2$/g, DBP adsorption: 360 ml/100 g). The weight ratio of Platinum to Ketjen Black EC is 1:1. Next, 10 g of this catalytic powder is mixed with 35 g of water and 59 g of an alcohol dispersion of hydrogen ion conductive polymer electrolyte (9% FSS produced by Asahi Glass Co., Ltd.) and then the powder is dispersed using an ultrasonic agitator to produce a catalyst layer ink. This catalyst layer ink is sprayed onto both main faces of the polymer electrolyte membrane 5A to form 20 μm-thick layers. These layers are subjected to thermal treatment at 115° C. for 20 minutes, thereby forming the catalyst layers 5B. It should be noted that, in the spray coating, the polymer electrolyte membrane 5A is covered with a mask having a 120 mm×120 mm opening.

Next, the gas diffusing layer 5C is formed so as to be joined to the catalyst layers 5B. The gas diffusing layer 5C is composed of a porous body having a large number of minute holes. Thereby, a gas penetrates into the holes so that it can be easily diffused, reaching the catalyst layer 5B. In this embodiment, a 123 mm-square carbon fiber cloth (Carbel CL 400 having a thickness of 400 μm and produced by JAPAN GORE-TEX Inc.) is laid over the polymer electrolyte membrane 5A having the catalyst layer 5B thereon. This carbon fiber cloth is hot pressed under a pressure of 0.5 MPa at a temperature of 135 degrees for 5 minutes, so that the gas diffusing layers 5C are respectively joined to the catalyst layers 5B formed on both main faces of the polymer electrolyte membrane 5A.

The second gaskets 8 are joined to both main faces of the portion of the polymer electrolyte membrane 5A between the gas diffusing layers 5C and the frame 6.

Figure 7:
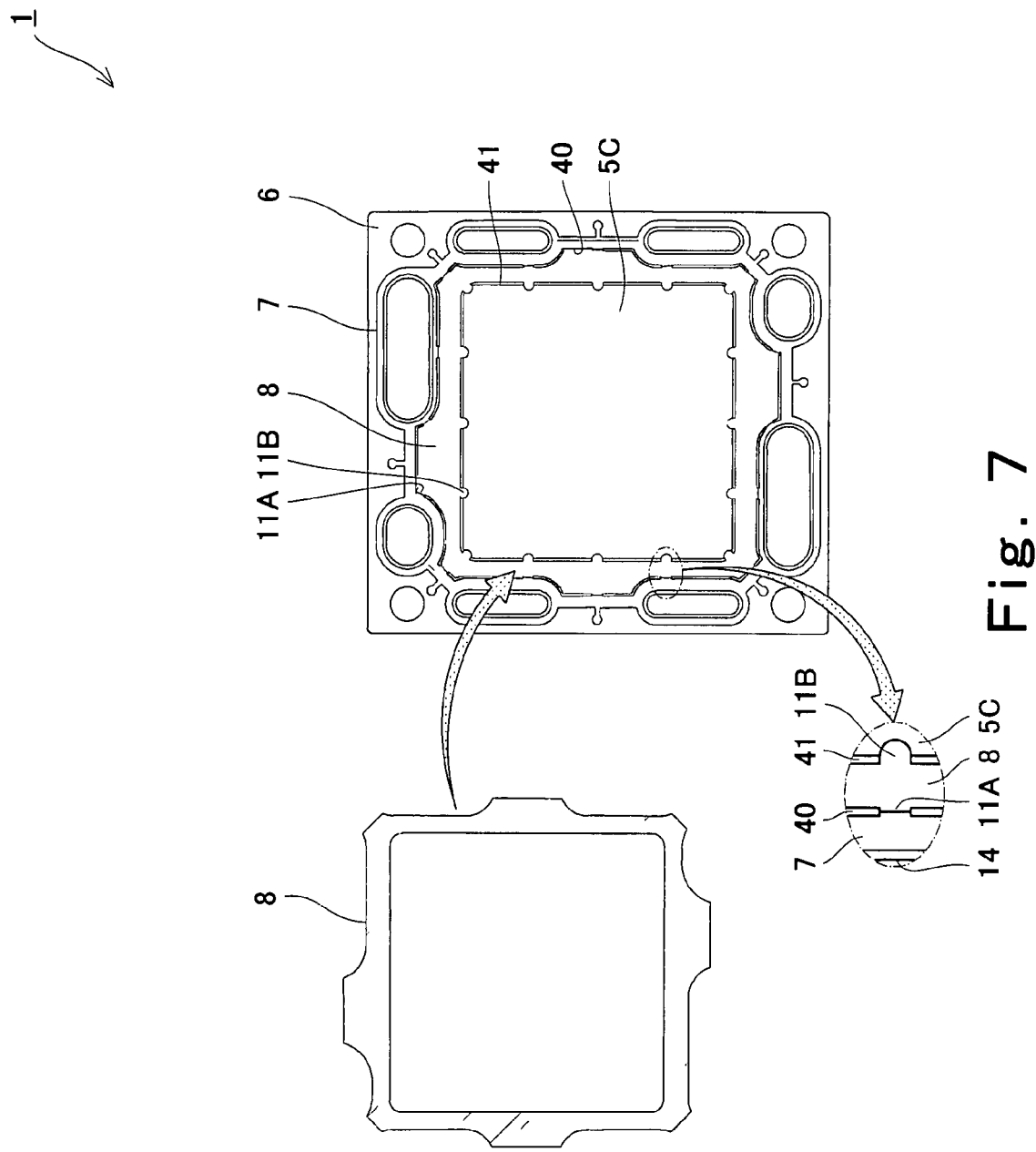
FIG. 7 is a plan view showing a structure of second gaskets and an MEA-gasket assembly to which the second gaskets are joined.

FIG. 7 is a plan view showing the structure of the second gaskets and the MEA-gasket assembly to which the second gaskets are joined.

The second gasket 8 is made of a thermoplastic resin or thermoplastic elastic material which contains the same plastic component as contained in the first gasket 7. It is also possible to use a thermoplastic resin containing a thermoplastic elastic material of the same type as of the first gasket 7. Concretely, if a polyolefin-based thermoplastic elastic material is used as the material of the first gasket 7, a thermoplastic resin containing polyethylene may be used as the material of the second gasket 8. Thereby, the second gasket 8 and the first gasket 7 contain the same plastic component and therefore can be fused and adhered to each other.

In this embodiment, the second gasket 8 is made of Santoprene 8101-55 (produced by Advanced Elastomer Systems) that is a thermoplastic elastic material of the same type as of the first gasket 7.

The second gasket 8 is formed into the shape corresponding to the annular gap between the first gasket 7 and the gas diffusion layer 5C. In this embodiment, the second gasket 8 is punched out from an extruded sheet (thickness: 0.32 mm) of Santoprene 8101-55. The second gasket 8 is in the shape of a ring having a 123.5 mm-square opening at the center thereof. More specifically, the inner gap 41 having a width of about 0.25 mm is formed between the outer peripheral edges of the 123 mm-square gas diffusing layer 5C and the inner peripheral edge of the second gasket 8. The outer peripheral edge of the second gasket 8 is separated from the inner circumference of the first gasket 7 so as to form the outer gap 40 having a width of about 0.5 mm therebetween.

The second gaskets 8 are placed on both main faces of the portion of the polymer electrolyte membrane 5A between the first gasket 7 and the gas diffusing layer 5C. The inner peripheral edge of the first gasket 7 is at least partially joined to the outer peripheral edge of the second gasket 8, and the inner peripheral edge of the second gasket 8 is at least partially joined to the outer peripheral edge of the gas diffusing layer 5C. More specifically, the MEA-gasket assembly 1 is manufactured with the annular outer gap 40 and the annular inner gap 41 partially closed. In this embodiment, the outer peripheral edge of the second gasket 8 is thermally fused and adhered to the inner peripheral edge of the first gasket 7, thereby forming the outer joint section 11A. Since the gas diffusing layer 5C is a porous body having minute holes, the inner peripheral edge of the second gasket 8 is fused into the holes in the outer peripheral edge of the gas diffusing layer 5C. Thus, the inner joint section 11B is formed. Concretely, the second gasket 8 and the first gasket 7 are fused, using a soldering gun. The step of fusing the second gasket 8 may be carried out by an automatic machine such as a bonder.

Thereby, the outer gap 40 is closed at the outer joint section 11A and the inner gap 41 is closed at the inner joint section 11B.

Since the inner peripheral edge of the first gasket 7 is at least partially in contact with the outer peripheral edge of the second gasket 8 and the inner peripheral edge of the second gasket 8 is at least partially in contact with the outer peripheral edge of the gas diffusing layer 5C as described above, it is possible to shut off the flow of the reducing gas when the cell 10 is in the assembled condition, the reducing gas flowing between the pair of reducing gas manifolds 22,22, running around the second gasket 8 and, more specifically, in the outer gap 40 or inner gap 41 located around the gas diffusing layers 5C so as to bypass the reducing gas passage 21. Also, the flow of the oxidizing gas can be shut off, the oxidizing gas flowing between the pair of oxidizing gas manifolds 33,33, running around the second gasket 8 and, more specifically, in the outer gap 40 or inner gap 41 located around the gas diffusing layer 5C so as to bypass the oxidizing gas passage 31. As a result, the decrease of the oxidizing gas/reducing gas utilization factor of the polymer electrolyte fuel cell and, therefore, the decrease of the gas utilization factor of the polymer electrolyte fuel cell can be further restrained.

Since the annular gap between the gas diffusing layer 5C and the first gasket 7 is deformed in the thickness-wise direction of the MEA-gasket assembly 1 and, in other words, is three-dimensionally formed, closing of the annular gap is not easy. However, the area of the annular gap formed between the outer peripheral edge of the gas diffusion layer 5C and the inner peripheral edge of the first gasket (annular gasket) 7 is reduced by the second gasket (annular gaskets) 8 when the cell 10 is in the assembled condition, and in consequence, the leak of the oxidizing gas or reducing gas to the outer periphery of the gas diffusing layer 5C is restrained so that the decrease of the gas utilization factor of the polymer electrolyte fuel cell can be further restrained. In addition, the second gaskets 8 divide the annular gap formed between the outer peripheral edges of the gas diffusing layers 5C and the inner peripheral edge of the first gasket 7 into two parts, namely, the coplanar annular gaps 40, 41, so that, in the annular gaps 40, 41 thus divided, the partial joining of the outer peripheral edge of the second gasket 8 and the inner peripheral edge of the first gasket 7 as well as the partial joining of the inner peripheral edge of the second gasket 8 and the outer peripheral edge of the gas diffusing layer 5C can be facilitated. In short, the planner, narrow outer gap 40 and inner gap 41 can be easily partially closed by fusing/adhesion etc. of the second gasket 8.

Furthermore, since secure joining of the inner peripheral edge of the first gasket 7 and the outer peripheral edge of the second gasket 8 as well as secure joining of the inner peripheral edge of the second gasket 8 and the outer peripheral edge of the gas diffusing layer 5C is accomplished by fusing/adhesion, the effect of the invention can be more reliably attained.

Next, the function of the polymer electrolyte fuel cell of this embodiment when it is in operation will be described below.

Figure 8:
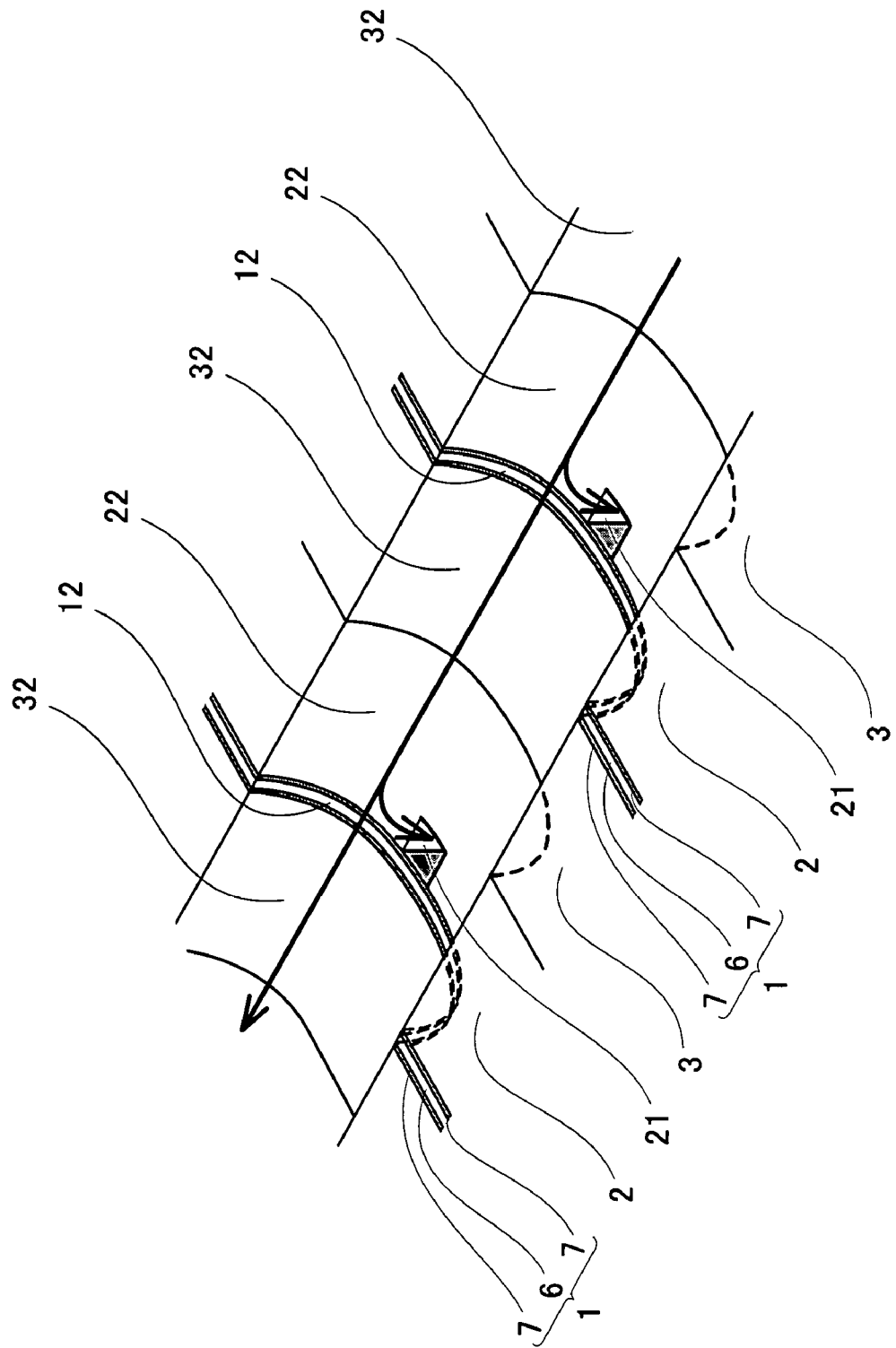
FIG. 8 is an enlarged perspective view of a section corresponding to the section shown in FIG. 16.
Figure 17:
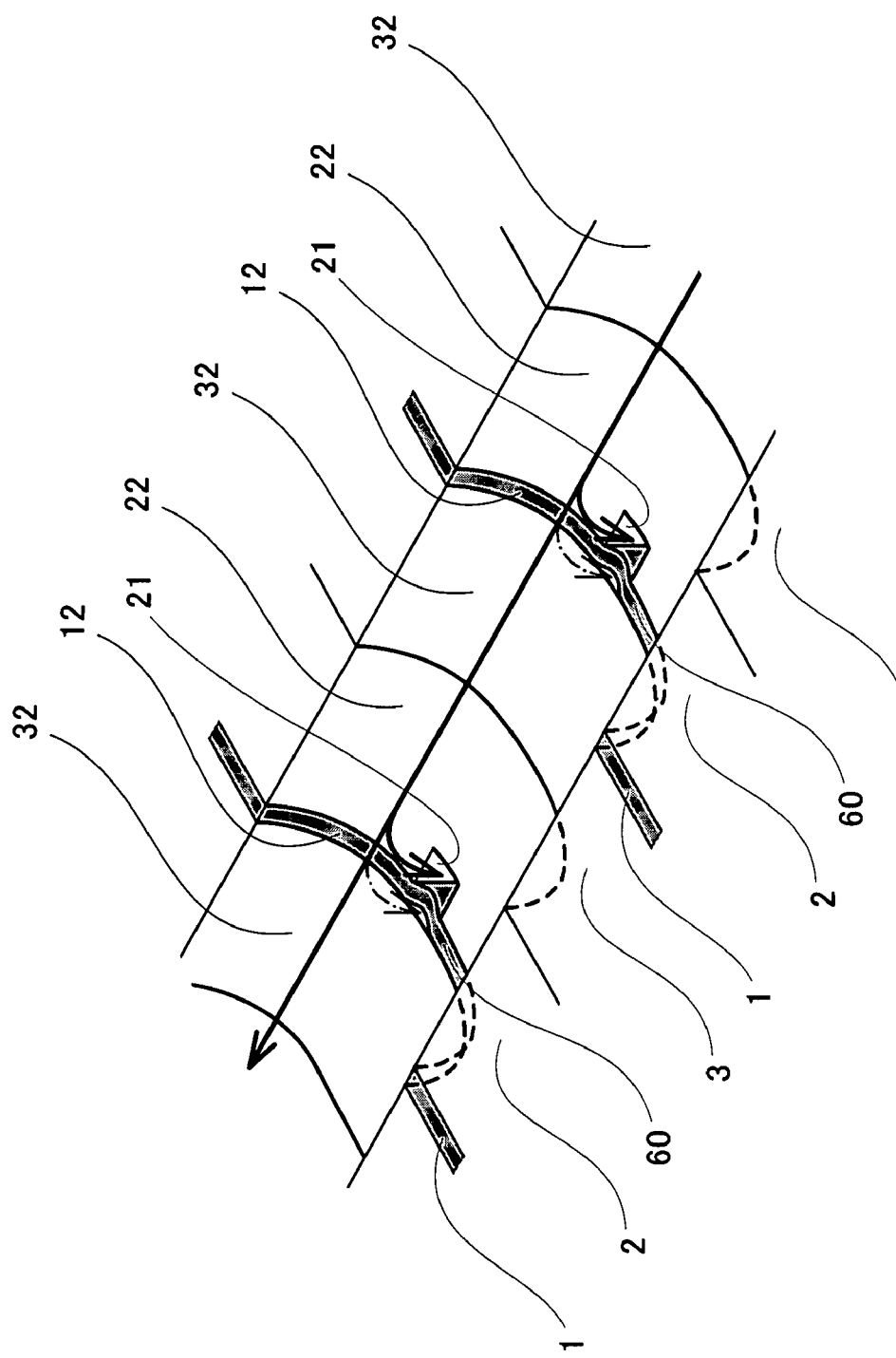
FIG. 17 is an enlarged perspective view of a section taken along line XVII-XVII of FIG. 16.

FIG. 8 shows an enlarged perspective view of a section corresponding to the section shown in FIG. 17. As illustrated in FIG. 8, the reducing gas supplied to the polymer electrolyte fuel cell passes through either one of the reducing gas manifolds and branches off to the reducing gas passage 21 from one of the reducing gas manifold holes 22 of the anode separator 2, being exposed to the MEA 5. The reducing gas then goes to the other reducing gas manifold through the other reducing gas manifold hole 22, and is discharged from the polymer electrolyte fuel cell after passing through the reducing gas manifold. Similarly, the oxidizing gas passes through either one of the oxidizing gas manifolds and goes out from the other oxidizing gas manifold.

In this process, the first gasket 7 is pressed against the cathode separator 3 by the pressing force of the frame 6 at the diverging point where the reducing gas diverges from the reducing gas manifold hole 22 to the reducing gas passage 21, because the frame 6 has rigidity. This lessens the possibility that the reducing gas penetrates into the space between the cathode separator 3 and the MEA-gasket assembly 1, or the oxidizing gas flowing in the oxidizing gas passage 31 defined by the cathode separator 3 and the MEA-gasket assembly 1 leaks to the diverging point. In short, the possibility of mixing of the oxidizing gas and the reducing gas, that is, the so-called cross leak phenomenon can be restrained. Although not shown in the drawing, the same is applied to the diverging point that lead to the reducing gas passage 21 defined by the cathode separator 3 and the MEA-gasket assembly 1. Specifically, the sealing of the space between the anode separator 2 and the MEA-gasket assembly 1 is ensured, which reduces the possibility of the cross-leak phenomenon of the oxidizing gas and the reducing gas caused by the penetration of the oxidizing gas into the space between the anode separator 2 and the MEA-gasket assembly 1, or caused by the leak of the reducing gas from the space between the anode separator 2 and the MEA-gasket assembly 1.

There will be hereinafter explained an example in which the polymer electrolyte fuel cell of the first embodiment is tested.

EXAMPLE 1

The following performance test was conducted on the polymer electrolyte fuel cell of the first embodiment.

1. Cross Leak Resistance Test

The openings of the oxidizing gas manifolds of the polymer electrolyte fuel cell of the first embodiment were sealed. The reducing gas manifolds were pressurized to 0 to 200 KPa by use of dried nitrogen gas, and the amount of dried nitrogen gas leaking to the oxidizing gas manifolds was measured.

As a result, a leak of the dried nitrogen gas to the oxidizing gas manifolds was not detected even when the reducing gas manifolds were pressurized up to 200 KPa.

2. Anode Pressure Loss Test

Dried nitrogen gas of 3 to 20 NL was allowed to flow in the reducing gas manifolds of the polymer electrolyte fuel cell of the first embodiment and the loss of pressure was measured.

As Comparative Example 1, a polymer electrolyte fuel cell was used which had the same structure as of the first embodiment except that the conventional MEA-gasket assembly was used in place of the MEA-gasket assembly 1. Specifically, Comparative Example 1 used an MEA gasket assembly (see FIG. 16) which had a pair of gaskets 60 made of an elastic body (fluorocarbon rubber was employed herein) instead of the frame 6 and in which the pair of gaskets 60 were joined to the polymer electrolyte membrane 5A so as to hold both faces of the peripheral region of the polymer electrolyte membrane 5A between.

As Comparative Example 2, a polymer electrolyte fuel cell was used which was the same as the polymer electrolyte fuel cell of Comparative Example 1 except that the annular gap between the inner peripheral edges of the gaskets joined to the peripheral region of the polymer electrolyte membrane 5A and the gas diffusing layer 5C was filled with fluorinated grease (produced by Daikin Industries Ltd. and marketed under the name of DEMNUM L200). By application of this fluorinated grease, not only the cross leaking route of the oxidizing gas and the reducing gas but also the bypass of the oxidizing gas and the reducing gas can be cut off, so that the oxidizing gas/reducing gas utilization factor can be improved. It however should be noted that the fluorinated grease melts away and therefore the effect of the fluorinated grease does not continue until the service life of the polymer electrolyte fuel cell expires.

The pressure loss in the polymer electrolyte fuel cells of Comparative Examples 1 and 2 was measured in the similar way.

Figure 9:
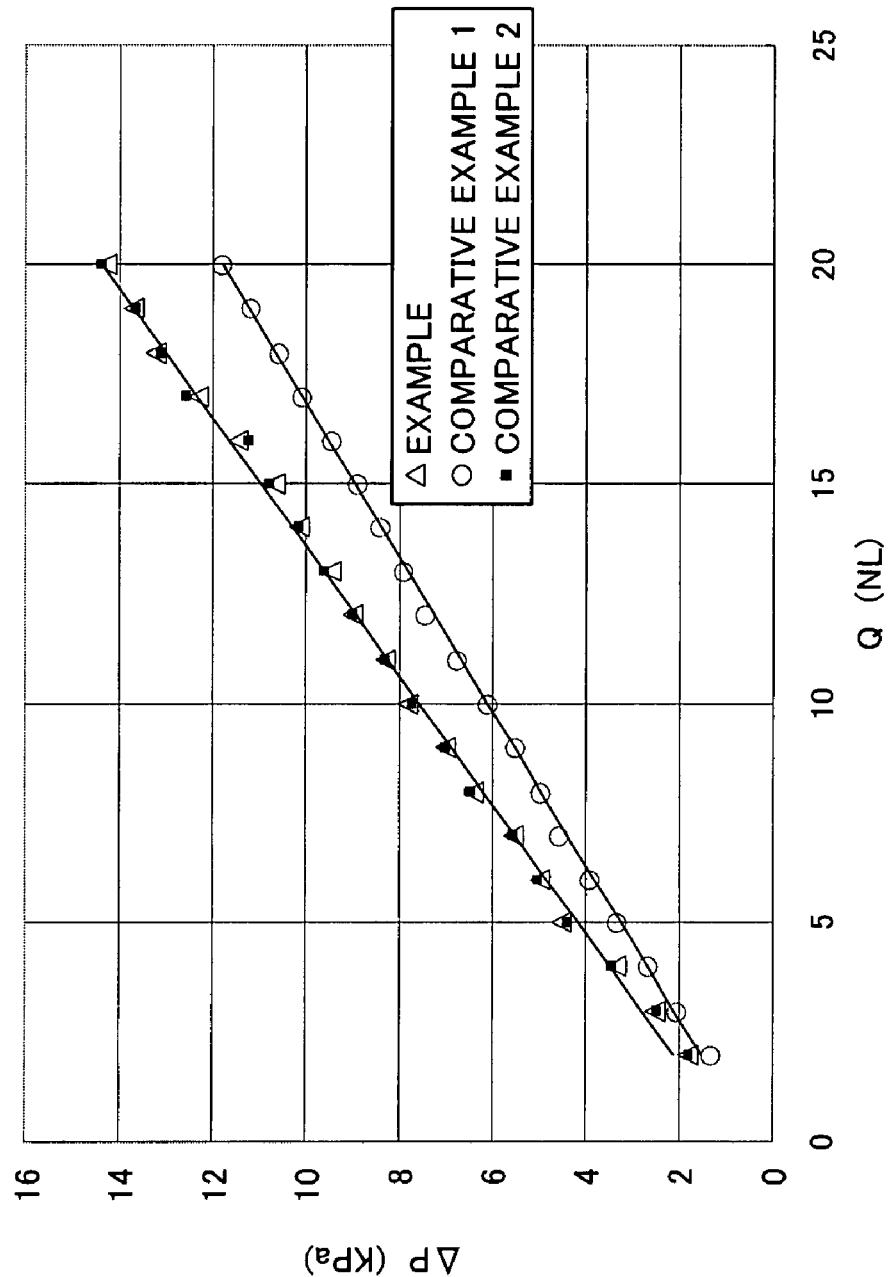
FIG. 9 is a graph showing the result of a pressure loss test.

FIG. 9 is a graph showing the result of the pressure loss test. As seen from FIG. 9, the pressure loss ΔP of Example 1 is about 20% higher than that of Comparative Example 1. In Example 1 and Comparative Example 2, substantially the same pressure loss ΔP was observed. This indicates that the outflow of the gas supplied to the reducing gas manifold, that is, the leak of the reducing gas from the reducing gas manifold holes 12, 22, 32 and the reducing gas passage 21 toward the oxidizing gas side or outside is restrained in Example 1.

3. Fuel Utilization Factor Test

While the reducing gas utilization factor is varied from 50% to 95%, the polymer electrolyte fuel cell of the first embodiment was operated and its average cell voltage V, which was average voltage per cell, was measured. The operating condition was as follows. As the oxidizing gas, air which had been humidified up to a dew point of 65° C. was supplied to the polymer electrolyte fuel cell such that the air utilization factor became 40%. As the reducing gas, a simulated reformed gas, which had been humidified up to a dew point of 65° C. and whose molar ratio of hydrogen to carbon dioxide had been adjusted to 4:1, was used. This simulated reformed gas was supplied to the polymer electrolyte fuel cell such that the reducing gas utilization factor R became 50% to 95%. The temperature of the polymer electrolyte fuel cell was adjusted to 65° C. with the water flowing in the water manifolds. The operation was performed with a current density of 0.2 A/cm$^2$.

The fuel utilization factor test was similarly conducted on Comparative Example 1.

Figure 10:
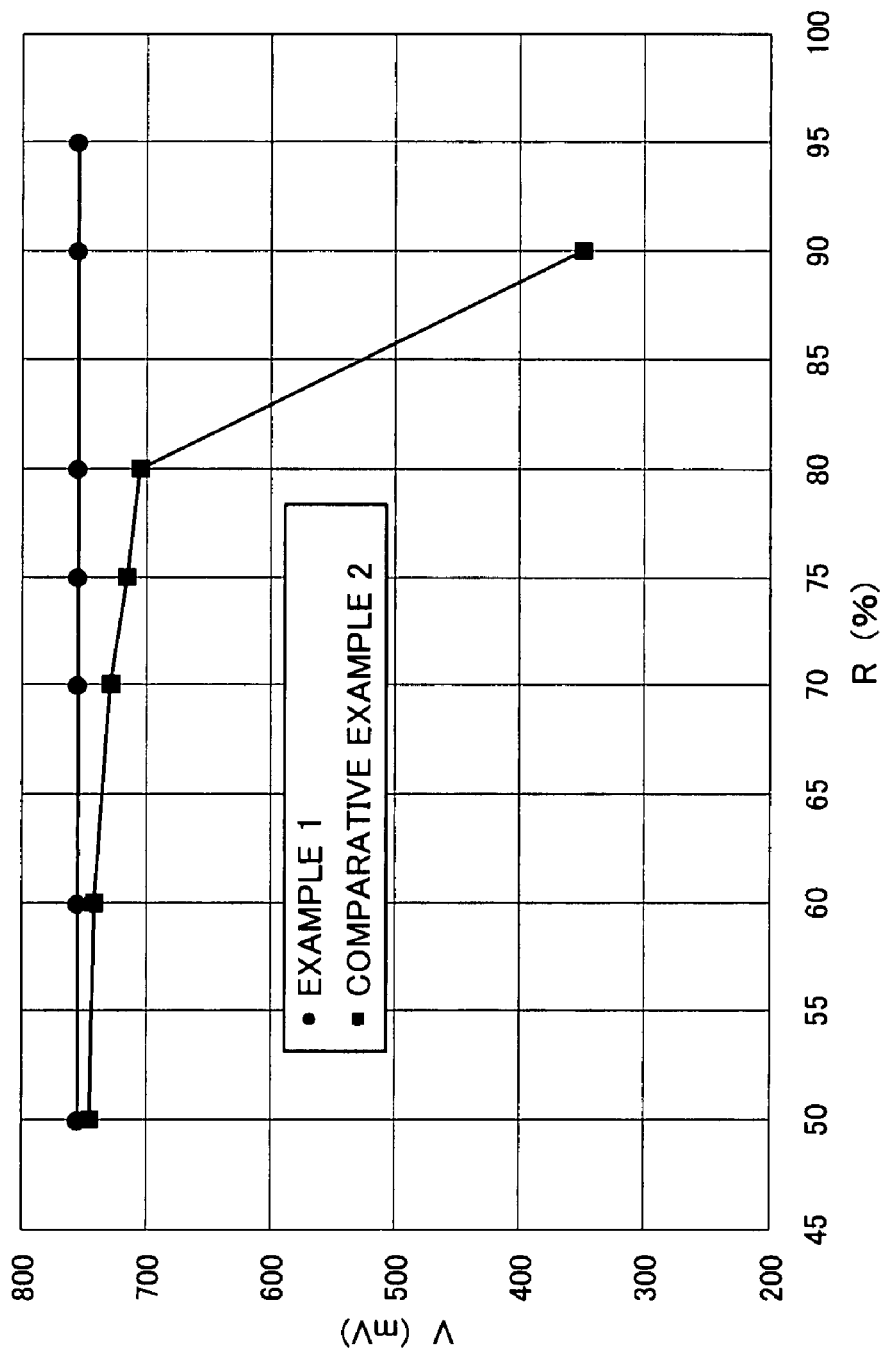
FIG. 10 is a graph showing the result of a reducing gas utilization factor test.

FIG. 10 is a graph showing the result of the reducing gas utilization factor test. As seen from FIG. 10, in Comparative Example 1, the average cell voltage V dropped in the region where the reducing gas utilization factor R was high. As the reason for this, it is assumed that as the reducing gas utilization factor increased, the flow rate of the reducing gas decreased with a decrease in the pressure loss within the reducing gas passage 21, so that it became difficult for the reducing gas to sweep dew drops away from the reducing gas passage 21 and, in consequence, the so-called flooding occurred. In contrast with this, in Example 1, the average cell voltage V did not drop even when the reducing gas utilization factor R became about 95% and therefore stable output was maintained. It is assumed that since the leak of the reducing gas and the decrease of the reducing gas utilization factor were more restrained in Example 1 compared to Comparative Exampled 1, a pressure loss higher than that of Comparative Example 1 could be ensured so that the flooding phenomenon could be restrained.

Second Embodiment

The polymer electrolyte fuel cell of the second embodiment is the same as that of the first embodiment except the material of the frame of the MEA-gasket assembly 1; the shapes of the main faces of the MEA-gasket assembly 1, the anode separator 2 and the cathode separator 3; and the layout of the manifold holes. Therefore, in the second embodiment, only the points different from the first embodiment will be explained.

Figure 11:
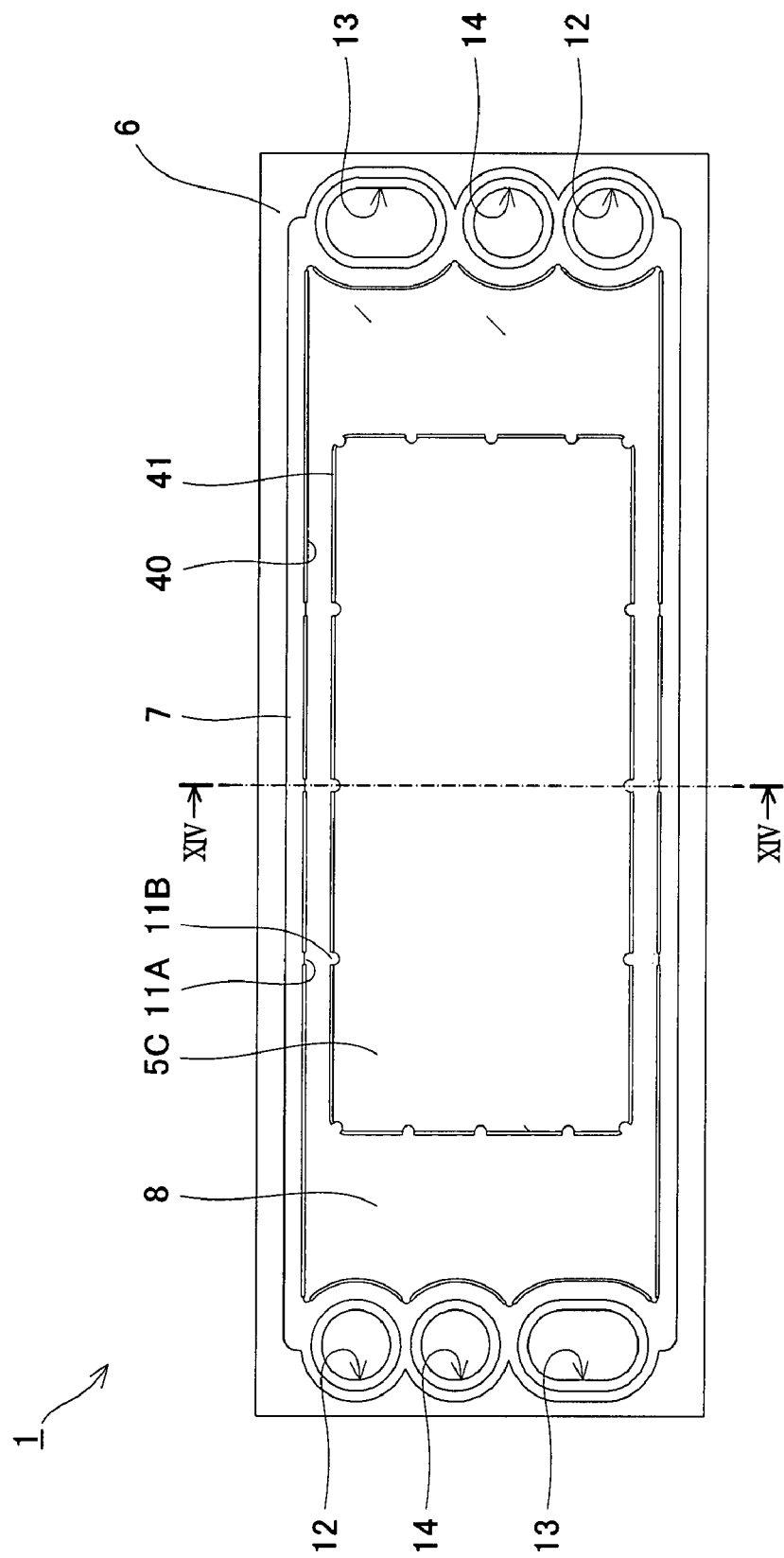
FIG. 11 is a plan view (anode separator side) showing a structure of an MEA-gasket assembly according to a second embodiment.

FIG. 11 is a plan view (anode separator side) showing a structure of the MEA-gasket assembly 1 of the second embodiment.

As the material of the frame 6, glass fiber containing polypropylene (produced by Idemitsu Petrochemical Co., Ltd. and marketed under the name of R350G) is used. The first gasket 1 is made of Santoprene 8101-55 (produced by Advanced Elastomer Systems), that is, a thermoplastic elastic material, similarly to the first embodiment. Since the first gasket 7 and the frame 6 both have polypropylene as a plastic component, the first gasket 7 is fused and integrally adhered to the frame 6 (this technique is generally called "coinjection molding") when molding the first gasket 7, whereby a joint structure is obtained. Although not shown in the drawings, the second embodiment does not need the through holes for joining 6A (see FIG. 3) used in the first embodiment, and therefore, the through holes for joining 6A are not formed when molding the frame 6.

The frame 6 has a rectangular main face. A pair of reducing gas manifold holes 12, a pair of oxidizing gas manifold holes 13 and a pair of water manifold holes 14 are provided in the periphery of the main face such that one hole of each pair is located at one end of the frame 6 and the other is located at the other end when viewed in a longitudinal direction of the main face of the frame 6.

Although not shown in the drawings, the anode separator 2 and the cathode separator 3 are molded and manifold holes are formed in correspondence with the shape of the MEA-gasket assembly 1.

When the performance test was conducted on the polymer electrolyte fuel cell of the second embodiment similarly to the first embodiment, a test result better than Comparative Example 1 could be obtained like the first embodiment. It was found that the second embodiment provided a polymer electrolyte fuel cell having improved performance like the first embodiment.

Third Embodiment

The polymer electrolyte fuel cell of the third embodiment does not differ from that of the second embodiment except that the material of the separators 2, 3 is metal. Therefore, in the third embodiment, only the points different from the second embodiment will be explained.

Figure 12:
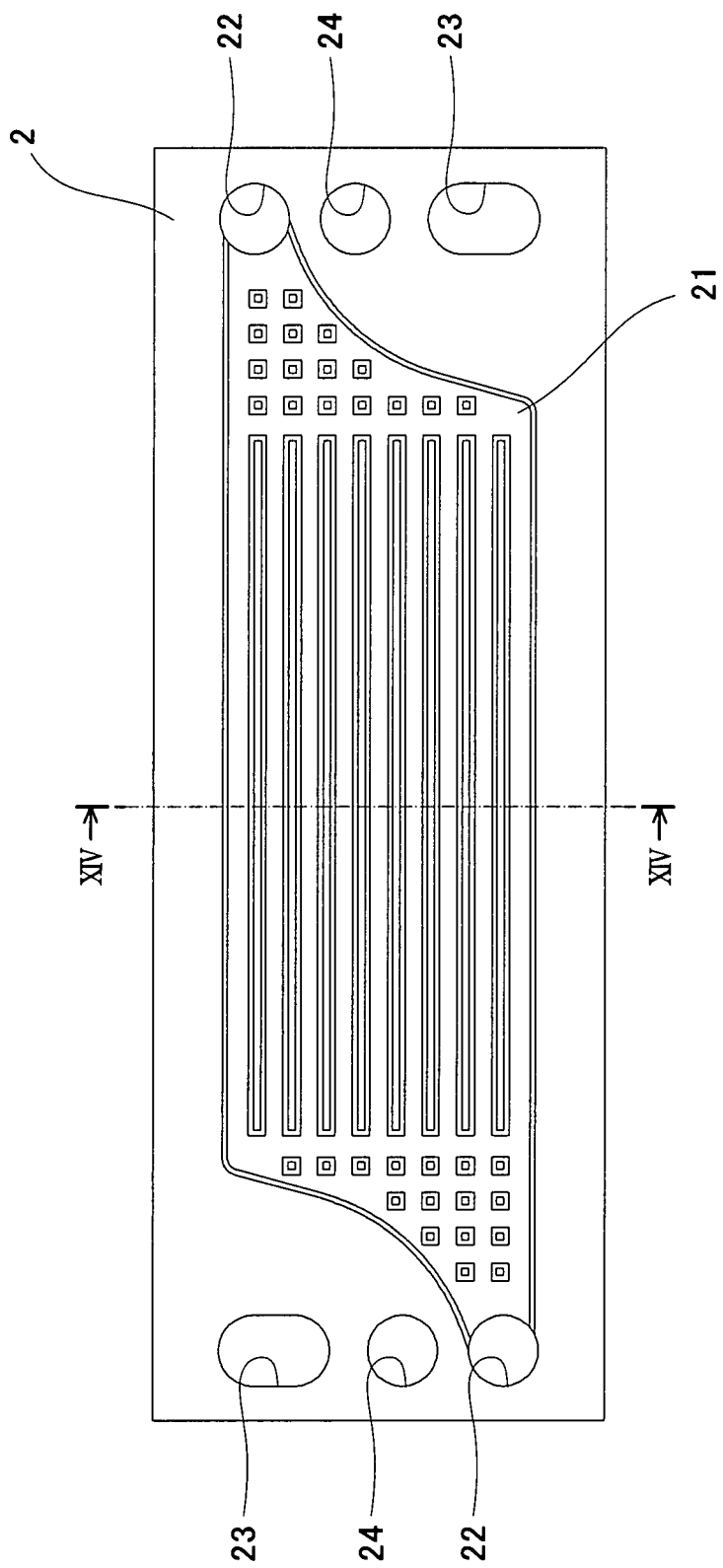
FIG. 12 is a plan view (MEA-gasket assembly side) showing a structure of an anode separator according to a third embodiment.
Figure 13:
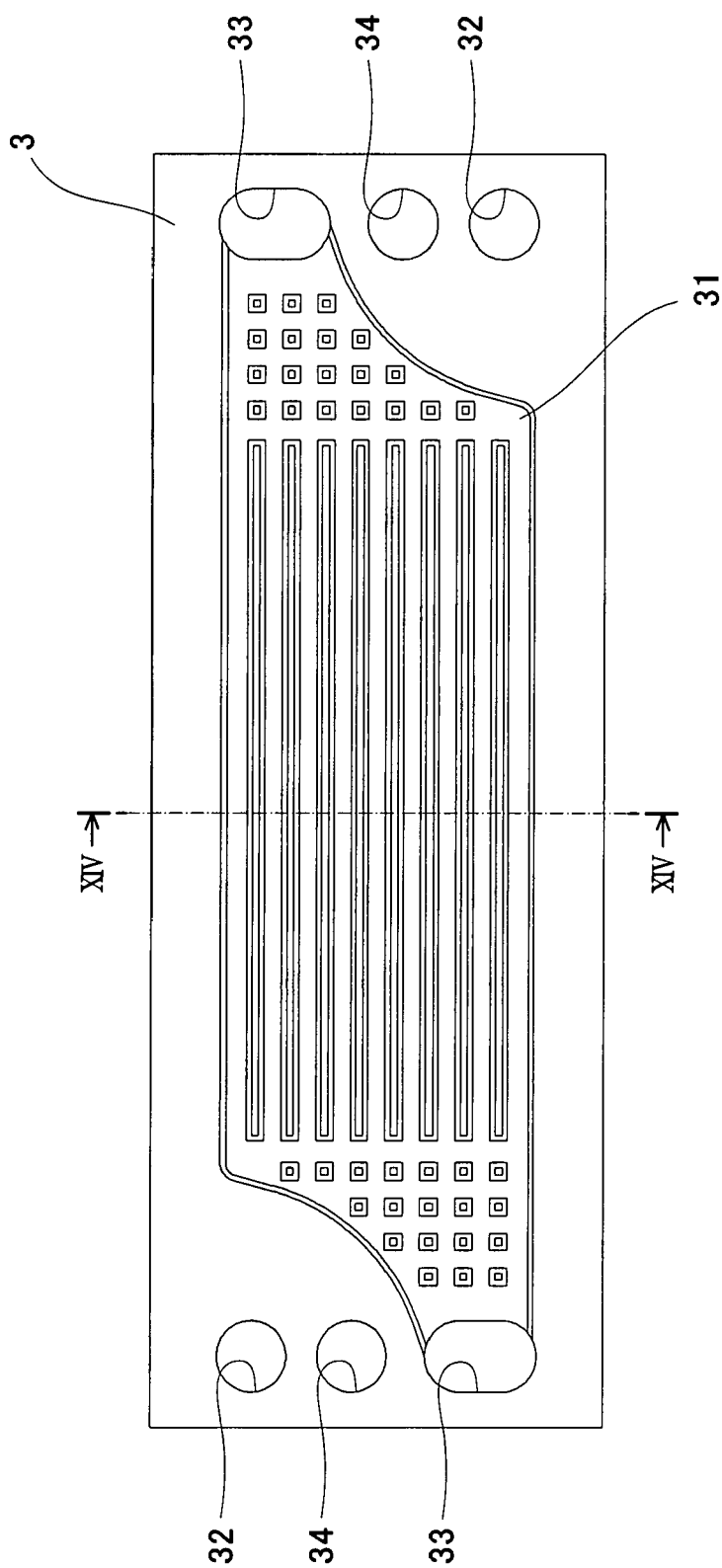
FIG. 13 is a plan view (MEA-gasket assembly side) showing a structure of a cathode separator according to the third embodiment.

FIG. 12 is a plan view (MEA-gasket assembly side) showing a structure of the anode separator of the third embodiment. FIG. 13 is a plan view (MEA-gasket assembly side) showing a structure of the cathode separator of the third embodiment.

These separators 2, 3 are molded by pressing the SUS composite material (which is a trial product produced by Sumitomo Metal Industries Ltd.). As illustrated in FIGS. 12, 13, the separators 2, 3 have the reducing gas passage 21 and the oxidizing gas passage 31, respectively, which are formed by pressing work.

Figure 14:
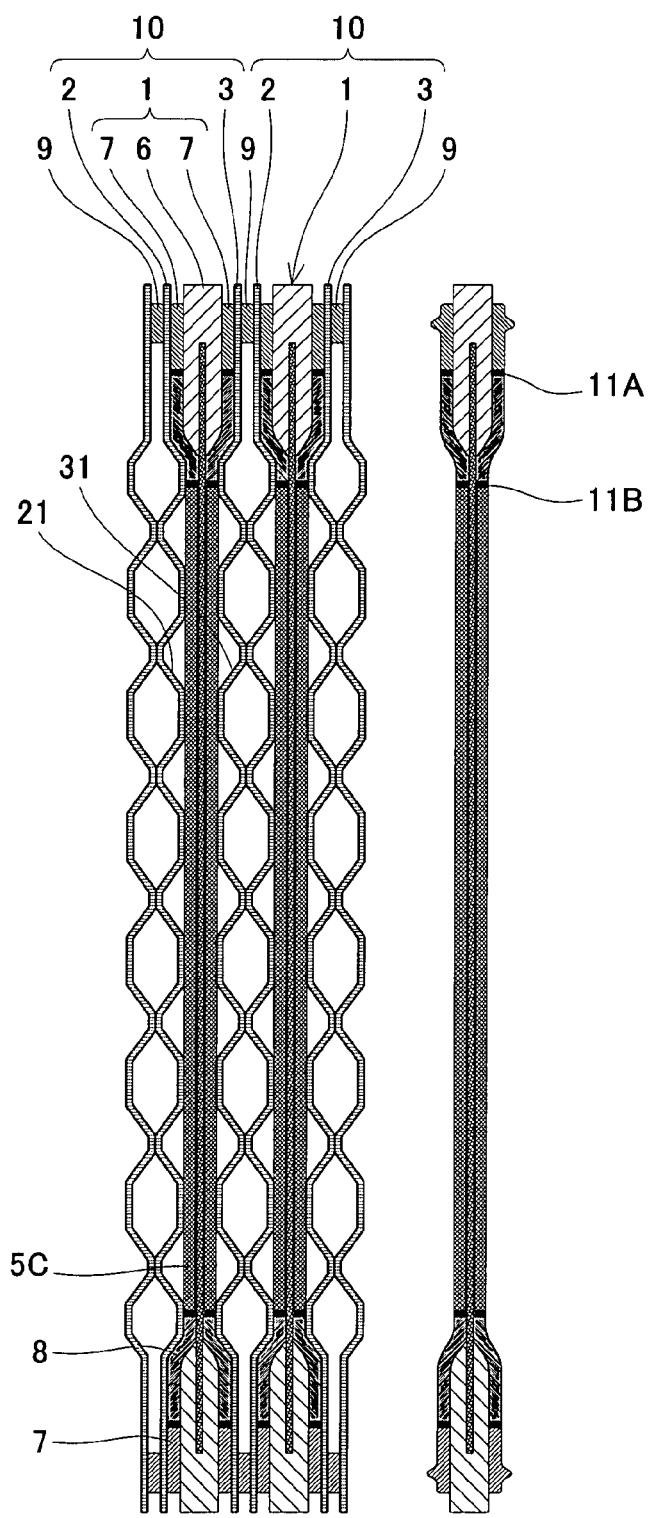
FIG. 14 is a sectional view showing a stacking structure of the cells 10 and taken along line XIV-XIV of FIGS. 11, 12, 13.

FIG. 14 is a sectional view showing a stacking structure of the cells 10 and taken along line XIV-XIV of FIGS. 11, 12, 3. As illustrated in FIG. 14, each cell 10 is formed such that the MEA-gasket assembly 1 is sandwiched between the separators 2, 3.

When the performance test was conducted on the polymer electrolyte fuel cell of the third embodiment similarly to the first embodiment, a test result better than Comparative Example 1 could be obtained like the first embodiment. It was found that the third embodiment provided a polymer electrolyte fuel cell having improved performance like the first embodiment.

As described in the first to third embodiments, in the MEA-gasket assembly 1 of the invention, the first gasket 7 having a sealing function is laid over the surfaces of the frame 6 that is a rigid body and therefore the MEA-gasket assembly 1 itself is not easily deformed, so that the leaks of gasses from the peripheries of the manifold holes 12, 13 are restrained and, in consequence, the so-called cross-leak phenomenon is restrained.

In addition, since the annular gap between the inner peripheral edge of the first gasket 7 laid over the faces of the frame 6 and the outer peripheral edge of the gas diffusing layer 5C is reduced by the second gaskets 8, the leaks of the reducing gas and the oxidizing gas into the gas diffusing layers 5C, the reducing gas passage 21 and the oxidizing gas passage 31 are restricted.

Further, since the inner peripheral edge of the first gasket 7 is at least partially joined to the outer peripheral edge of the second gasket 8 and the inner peripheral edge of the second gasket 8 are at least partially joined to the outer peripheral edge of the gas diffusing layer 5C, it is possible to shut off the flows of the reducing gas and the oxidizing gas, the reducing gas flowing between the pair of reducing gas manifolds 22,22, running around the second gasket 8 and, more specifically, in the outer gap 40 or inner gap 41 located around the gas diffusing layer 5C so as to bypass the reducing gas passage 21, whereas the oxidizing gas flowing between the pair of oxidizing gas manifolds 33,33, running similarly to the reducing gas so as to bypass the oxidizing gas passage 31. As a result, the decrease of the oxidizing gas/reducing gas utilization factor can be further restrained.

The third embodiment of the invention accordingly provides a polymer electrolyte fuel cell having improved performance thanks to the restraint of the cross-leak phenomenon and an improvement in the oxidizing gas/reducing gas utilization factor.

Fourth Embodiment

The polymer electrolyte fuel cell of the fourth embodiment does not differ from that of the first embodiment except that the MEA-gasket assembly 1 of the fourth embodiment does not use the second gasket and the frame 6 is made of a material different from that of the first embodiment. Therefore, in the fourth embodiment, only the points different from the first and second embodiments will be explained.

Figure 15A:
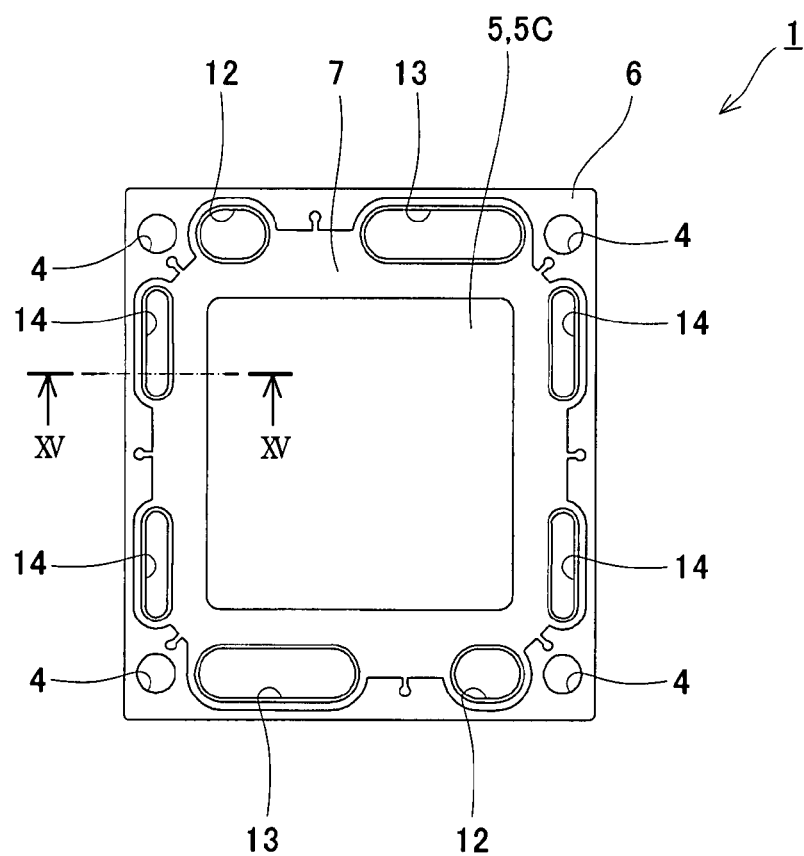
FIG. 15(a) is a plan view (cathode separator side) and FIG. 15(b) is a sectional view taken along line XV-XV of FIG. 15(a).
Figure 15B:
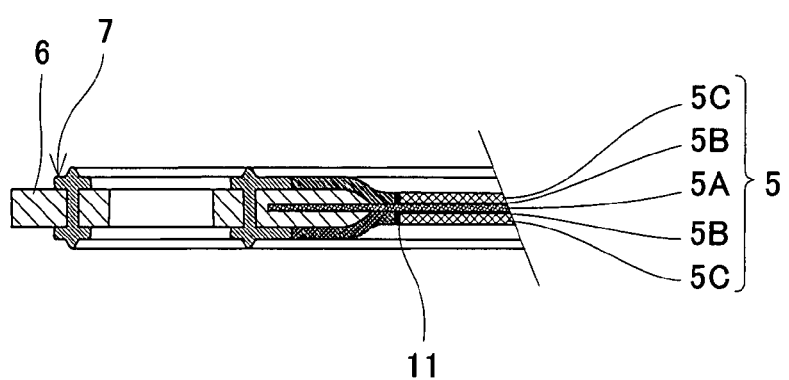

FIG. 15 is a view illustrating a structure of the MEA-gasket assembly according to the fourth embodiment, wherein FIG. 15(a) is a plan view (cathode separator side) and FIG. 15(b) is a sectional view taken along line XV-XV of FIG. 15(a). As the material of the frame 6, glass fiber containing polypropylene (produced by Idemitsu Petrochemical Co., Ltd. and marketed under the name of R350G) is used. The first gasket 1 is made of Santoprene 8101-55 (produced by Advanced Elastomer Systems), that is, a thermoplastic elastic material, similarly to the first embodiment. Since the first gasket 7 and the frame 6 both have polypropylene as a plastic component, the first gasket 7 is fused and integrally adhered to the frame 6 (this technique is generally called "coinjection molding") when molding the first gasket 7, whereby a joint structure is obtained. Although not shown in the drawings, the fourth embodiment does not need the through holes for joining 6A (see FIG. 3) used in the first embodiment, like the second embodiment, and therefore, the through holes for joining 6A are not formed when molding the frame 6.

The inner peripheral edge of the first gasket 7 is configured so as to be in contact with the entire outer periphery of the gas diffusing layer 5C. Thereby, the gap located around the outer peripheral edge of the gas diffusing layer is totally closed and therefore the leaks of the reducing gas and the oxidizing gas outwardly from the outer peripheral edge of the gas diffusing layer 5C are restrained. As a result, the decrease of the oxidizing gas/reducing gas utilization factor can be further restrained with a structure simpler than those of the first and third embodiments.

In addition, the inner peripheral edge of the first gasket 7 melts, running into the entire outer peripheral edges of the gas diffusing layers 5C, so that a joint portion 11 is formed. Accordingly, the inner peripheral edge of the first gasket 7 is joined to the entire outer peripheral edges of the gas diffusing layers 5C, and in consequence, the leaks of the reducing gas and the oxidizing gas from the outer peripheral edges of the gas diffusing layer 5C can be more reliably restrained.

Although the first gasket 7 is joined to the entire periphery of the gas diffusing layer 5C in the above description, at least a part of the inner peripheral edge of the first gasket 7 may be brought into contact with the gas diffusing layer 5C so as to run into the outer peripheral edge of the gas diffusing layer 5C. Thereby, the decrease of the oxidizing gas/reducing gas utilization factor of the polymer electrolyte fuel cell can be restrained, like the first and second embodiments.

Similarly to the first embodiment, the fourth embodiment can restrain the risk of the penetration of the reducing gas or oxidizing gas into the space between the contact faces of each separator 2 (3) and the MEA-gasket assembly 1 and the risk of the so-called cross-leak phenomenon without involving intricate processing of the separators and use of an additional part, that is, the second gasket 8. In addition, since the annular gap formed between the inner peripheral edge of the first gasket 7 and the outer peripheral edge of the gas diffusing layer 5C is at least partially closed, the flows of the reducing gas and the oxidizing gas around the gas diffusing layer 5C can be restrained with a simple structure.

The fourth embodiment is characterized by the manufacturing step in which after formation of the gas diffusing layer 5C, the first gasket 7 is formed so as to be in contact with the gas diffusing layer 5C. Generally, those skilled in the art have considered that it is difficult to form the first gasket 7 so as to be in contact with the gas diffusing layer 5C after formation of the gas diffusing layer 5C. More specifically, at least the following points have been thought to be difficult to overcome: (1) the gas diffusing layer 5C inevitably gets damaged when the die used for forming the first gasket 7 is brought into contact with the gas diffusing layer 5C; (2) a portion of the polymer electrolyte membrane, which is exposed to the annular gap between the inner peripheral edge of the frame 6 and the outer peripheral edge of the gas diffusing layer 5C is broken, during the molding process of the first gasket 7; (3) a gap is left between the inner peripheral edge of the first gasket 7 and the outer peripheral edge of the gas diffusing layer 5C, because of insufficient ventilation, i.e., insufficient gas evacuation in the course of molding. However, the inventors have made the present invention after making intensive researches focusing on the facts that the gas diffusing layer 5C has a porous structure and a certain degree of restoring power relative to a compressive force exerting in the thickness-wise direction of the MEA 5 and that satisfactory gas evacuation is enabled by making use of the air permeability of the gas diffusing layer 5C.

A method of manufacturing the MEA-gasket assembly 1 of the fourth embodiment will be described below.

First, the catalyst layers 5B are formed at the center of the polymer electrolyte membrane 5A and then, the gas diffusing layers 5C are formed, whereby the MEA 5 is formed. Herein, "PRI MEA®" produced by JAPAN GORE-TEX Inc. is used in which the MEA 5 has a thickness of about 850 µm and the gas diffusing layer 5C has a thickness of 400 µm and include a carbon cloth as a substrate.

The frame 6 is formed so as to be joined to the polymer electrolyte membrane 5A located in the peripheral region of the MEA 5. Herein, after the polymer electrolyte membrane 1A in the peripheral region of the MEA 5 is cut into a specified shape, the frame 6 is molded so as to be placed on the peripheral region of the MEA 5, using glass fiber containing polypropylene (produced by Idemitsu Petrochemical Co., Ltd. and marketed under the name of R350G).

Next, the first gasket 7 is molded in the annular gap between the inner peripheral edge of the frame 6 and the gas diffusing layer 5C. The first gasket 7 is made by injection molding from Santoprene 8101-55 (produced by Advanced Elastomer Systems) like the first embodiment.

After intensively studying the mechanism of the breakage caused by pressure during the injection molding of the polymer electrolyte membrane 1A exposed to the annular gap, the inventors deduced that the cause of the breakage resided in the condition where the molding pressure generated on one face of the polymer electrolyte membrane 1A is higher than on the other face. They also found that the damage could be prevented by making the flowing speeds of the material injected onto the front and rear faces of the polymer electrolyte membrane 1A during injection molding equal to each other. Concretely, the die used for injection molding of the first gasket 7 has a configuration which allows the injected material to easily move to the outer peripheral side. More specifically, the die is formed with a commonly-used die machining technique such that, in injection-molding of the first gasket 7, after the cavity, which corresponds to the outer peripheral side (the frame 6 side) of the first gasket 7, is filled with the injected material, the injected material flows toward the polymer electrolyte membrane 5A to form the inner peripheral side of the first gasket 7.

The die has a gas vent hole (vent) located in a position opposed to the center of the gas diffusing layer 5C. Thereby, the gas within the die, which has been removed by penetration of the injected material during molding, can move from the gas vent hole to the outside, passing through the porous diffusing layer 5C, so that the injected material can move to the outer peripheral edge of the gas diffusing layer 5C.

The die is designed to press the entire outer peripheral area (having a width of about 2 mm) of the gas diffusing layer 5C by about 100 µm in a thickness-wise direction thereof. Thereby, the injected material is prevented from penetrating into the center of the gas diffusing layer 5C at the outer peripheral edge of the gas diffusing layer 5C and the joint portion 11 is formed so as to surround the entire outer peripheral edge of the gas diffusing layer 5C. Since the gas diffusing layer 5C is of a porous structure, their thickness is restored to a certain extent after completion of the molding operation. In addition, the gas diffusing layers 5C are squashed by the separators 2, 3 when the cell is in its assembled condition. Therefore, the pressure exerted on the gas diffusing layer 5C during injection molding does not cause a decrease in the performance of the fuel cell.

In this way, the first gasket 7 is joined to the main faces of the frame 6 similarly to the first embodiment. Additionally, the inner peripheral edge of the first gasket 7 is thermally fused into the outer peripheral edge of the gas diffusing layer 5C.

The performance test was conducted on the polymer electrolyte fuel cell of the fourth embodiment in the similar way to the first embodiment. As a result, a test result better than Comparative Example 1 was obtained, like the first embodiment. It was found that the fourth embodiment provided a polymer electrolyte fuel cell having an improved performance like the first embodiment.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function maybe varied substantially without departing from the spirit of the invention.

INDUSTRIAL APPLICABILITY

The MEA-gasket assembly and the polymer electrolyte fuel cell using the same according to the invention have the effect of restraining the cross-leak of the oxidizing gas and the reducing gas at the diverging points where the gases diverge from the manifold holes to the passages within the inner faces of the separators, and restraining the flows of the reducing gas and the oxidizing gas around the gaskets and the outer peripheries of the gas diffusing layers, with a simple structure while avoiding intricate processing of the separators and additional use of parts.

The invention claimed is:

1. An MEA-gasket assembly comprising:
    an MEA having a polymer electrolyte membrane, a catalyst layer and a gas diffusing layer;
    a plate-shaped frame which is joined to a portion of said polymer electrolyte membrane so as to enclose said MEA, said portion being located in a peripheral region of said MEA, and which has a plurality of fluid manifold holes;
    an annular gasket formed of an elastic body formed on both faces of said frame wherein the frame is comprised a material different than that of the annular gasket;
    wherein an annular gap formed between an inner peripheral edge of said annular gasket and an outer peripheral edge of said gas diffusing layer is at least partially closed, and
    an annular member formed of an elastic body disposed between said annular gasket and said gas diffusing layer;
    wherein the outer peripheral edge of said annular member is partially in contact with the inner peripheral edge of said annular gasket and the inner peripheral edge of said annular member is partially in contact with the outer peripheral edge of said gas diffusing layer such that said annular gap is at least partially closed.

2. The MEA-gasket assembly according to claim 1, wherein the inner peripheral edge of said annular gasket and the outer peripheral edge of said gas diffusing layer are at least partially in contact with each other such that the annular gap is at least partially closed.

3. The MEA-gasket assembly according to claim 2, wherein the inner peripheral edge of said annular gasket is thermally fused into the outer peripheral edge of said gas diffusing layer.

4. The MEA-gasket assembly according to claim 1, wherein the inner peripheral edge of said annular member is thermally fused into the outer peripheral edge of said gas diffusing layer and the outer peripheral edge of said annular member and the inner peripheral edge of said annular gasket are at least partially thermally fused and adhered to each other.

5. The MEA-gasket assembly according to claim 1, wherein said frame is made of a thermoplastic resin, said annular gasket is made of a thermoplastic elastic material, said frame and said annular gasket contain the same plastic component, and said annular gasket is thermally fused and adhered to both faces of said frame.

6. The MEA-gasket assembly according to claim 1, wherein said frame has a compressive elasticity modulus of not less than 2,000 MPa and not more than 200,000 MPa and said annular gasket has a compressive elasticity modulus of more than 0 MPa and not more than 200 MPa.

7. A polymer electrolyte fuel cell
wherein one or more cells are stacked, each cell having said MEA-gasket assembly described in claim 1 and an anode separator and a cathode separator which are disposed so as to sandwich said MEA-gasket assembly between,
wherein said anode separator and said cathode separator respectively have fluid manifold holes at positions corresponding to the plurality of fluid manifold holes provided in said MEA-gasket assembly, and
wherein said anode separator and said cathode separator respectively have a fluid passage groove in the inner faces thereof to connect at least a pair of fluid manifold holes each other.

* * * * *